(12) United States Patent
Toguri

(10) Patent No.: US 7,624,408 B2
(45) Date of Patent: Nov. 24, 2009

(54) APPARATUS, METHOD, AND SYSTEM FOR INFORMATION PROCESSING, AND RECORDING MEDIUM

(75) Inventor: Yasuhiro Toguri, Kanagawa (JP)

(73) Assignee: Sony Corporation, Tokyo (JP)

( * ) Notice: Subject to any disclaimer, the term of this patent is extended or adjusted under 35 U.S.C. 154(b) by 61 days.

(21) Appl. No.: 09/879,353

(22) Filed: Jun. 12, 2001

(65) Prior Publication Data

US 2002/0053085 A1   May 2, 2002

(30) Foreign Application Priority Data

Jun. 13, 2000   (JP)   ............... 2000-176723

(51) Int. Cl.
*H04N 7/10* (2006.01)
*H04N 7/025* (2006.01)

(52) U.S. Cl. ............... 725/34; 725/32; 725/35
(58) Field of Classification Search ............ 725/33–36, 725/86–100, 32
See application file for complete search history.

(56) References Cited

U.S. PATENT DOCUMENTS

| | | | | |
|---|---|---|---|---|
| 4,536,791 A | * | 8/1985 | Campbell et al. | ............. 725/28 |
| 5,027,400 A | * | 6/1991 | Baji et al. | .................... 380/211 |
| 5,724,521 A | * | 3/1998 | Dedrick | ........................ 705/10 |
| 5,754,939 A | * | 5/1998 | Herz et al. | ................. 455/3.04 |
| 5,805,235 A | * | 9/1998 | Bedard | ......................... 725/38 |
| 5,872,588 A | * | 2/1999 | Aras et al. | ..................... 725/14 |
| 5,995,092 A | * | 11/1999 | Yuen et al. | .................... 725/40 |
| 6,002,393 A | * | 12/1999 | Hite et al. | .................... 345/719 |
| 6,055,573 A | * | 4/2000 | Gardenswartz et al. | ........ 705/26 |
| 6,084,628 A | * | 7/2000 | Sawyer | ..................... 379/93.12 |
| 6,173,317 B1 | * | 1/2001 | Chaddha et al. | ............. 709/219 |
| 6,282,713 B1 | * | 8/2001 | Kitsukawa et al. | ............ 725/36 |
| 6,351,745 B1 | * | 2/2002 | Itakura et al. | ............... 705/400 |
| 6,385,592 B1 | * | 5/2002 | Angles et al. | ................. 705/14 |
| 6,434,747 B1 | * | 8/2002 | Khoo et al. | ................... 725/46 |
| 6,446,261 B1 | * | 9/2002 | Rosser | ........................ 725/34 |
| 7,051,351 B2 | * | 5/2006 | Goldman et al. | ............. 725/34 |
| 2003/0135853 A1 | * | 7/2003 | Goldman et al. | ............. 725/34 |
| 2003/0145323 A1 | * | 7/2003 | Hendricks et al. | ............. 725/34 |
| 2005/0188328 A1 | * | 8/2005 | Sezan et al. | ................. 715/789 |

* cited by examiner

*Primary Examiner*—Christopher Kelley
*Assistant Examiner*—Justin E Shepard
(74) *Attorney, Agent, or Firm*—Finnegan, Henderson, Farabow, Garrett & Dunner, L.L.P.

(57) ABSTRACT

Apparatus, method, and system as well as recording media designed to process information so as to enable individual information to be delivered per user, together with the AV contents. A server analyzes a delivery request received from the terminal, and as a result of this analysis, general purpose additional information is extracted from the additional information master database. Concurrently, reference is made to the user information on the user information database, so the user requested individual additional information is extracted from the additional information master database. The server edits the extracted general purpose additional information and individual additional information, creates the individual metadata for delivery, reads out the delivery requested AV contents stored in the AV contents database, and delivers the relevant AV contents together with the individual metadata via the Internet to the terminal.

23 Claims, 21 Drawing Sheets

FIG.11

| | 51 | |
|---|---|---|
| | USER ID | USER ID NO. |
| | USER APPELLATION | USER NAME |
| | USER CLASSIFICATION | USER USAGE CLASSIFICATION, MEMBERSHIP TYPE OR THE LIKE |
| | INFORMATION GENRE | INFORMATION GENRE OF THE INDIVIDUAL ADDITIONAL INFORMATION DESIRED BY THE USER |
| | DEGREE OF DETAIL OF INFORMATION | DEGREE OF DETAILS OF INFORMATION DESIRED BY THE USER |
| | USAGE FREQUENCY | USER USAGE STATUS BY GENRE |
| | TOTAL CHARGING | CURRENT ENTIRE CHARGING AMOUNT TO THE USER |

| | 52 | |
|---|---|---|
| | USER ID | USER ID NO. |
| | CHARGING TIME AND DATE | TIME AND DATE OF CHARGING PROCESSING |
| | CONTENTS ID | ID NO. OF AV CONTENTS USED |
| | ADDITIONAL INFORMATION ID | ID NO. OF THE INDIVIDUAL ADDITIONAL INFORMATION USED |
| | CHARGING FEE | AMOUNT CHARGED FOR USING INFORMATION |

| CONTENTS ID | ID NO. OF THE AV CONTENTS |
|---|---|
| SEGMENT NO. | NO. OF SEGMENT |
| SEGMENTATION | TIME REGION  SPACE REGION |
| START POSITION | SEGMENT START POSITION |
| END POSITION | SEGMENT END POSITION |
| : | : |

61

| CONTENTS ID | ID NO. OF THE AV CONTENTS |
|---|---|
| CLASSIFICATION | CLASSIFICATION OF THE AV CONTENTS: 1-MOVIE, 2- MUSIC, 3 - NEWS |
| FORMAT | FORMAT OF THE AV CONTENTS: 1- PCM, 2-MPEG, 3- MP3 ... |
| REPRODUCTION TIME | REPRODUCTION TIME OF THE AV CONTENTS |
| REGISTRATION DATE | DATE OF AV CONTENTS INFORMATION REGISTRATION |
| LOCATION | STORAGE LOCATION, FILE BUS, URL OR THE LIKE |
| SIZE | DATA SIZE OF THE AV CONTENTS |
| TITLE | TITLE OF THE AV CONTENTS |
| LEADING ROLE PLAYER | LEADING ACTOR/ACTRESS OF THE AV CONTENTS |
| COPYRIGHT | COPYRIGHT INFORMATION OF THE AV CONTENTS |
| USAGE CLASSIFICATION | USAGE PERMITTED CLASS OF THE AV CONTENTS:1-EVERYONE, 2-MEMBERS ONLY |
| ADDITIONAL EXPLANATION | OTHER ADDITIONAL INFORMATION AND EXPLANATION REGARDING THE OVERALL AV CONTENTS |
| NUMBER OF SEGMENTS | NUMBER OF SPLITS OF SEGMENT INTERVALS OF THE AV CONTENTS |
| : | : |

63

| CONTENTS ID | |
|---|---|
| GENERAL-PURPOSE ADDITIONAL INFORMATION ID | |
| PART COVERED BY ADDITIONAL INFORMATION | PART COVERED BY ADDITIONAL INFORMATION: 1-ENTIRE SEGMENT, 2 - ENTIRE SCENE, 3 -OBJECT |
| NAME COVERED BY ADDITIONALLY INFORMATION | NAME OF THAT WHICH IS COVERED BY ADDITIONAL INFORMATION: SCENE OF XXX OR THE LIKE |
| SEGMENT NO. | SEGMENT NO. COVERED BY THE ADDITIONAL INFORMATION IN THE AV CONTENTS |
| SCENE NO. | SCENE NO. COVERED BY THE ADDITIONAL INFORMATION IN THE SEGMENT |
| OBJECT NO. | OBJECT NO. APPEARING IN THE SEGMENT |
| ADDITIONAL INFORMATION CLASSIFICATION | DATA FORMAT OF THE ADDITIONAL INFORMATION: 1-TEXT, 2-IMAGE DATA, 3-MUSIC DATA |
| ADDITIONAL INFORMATION | ADDITIONAL INFORMATION DATA REGARDING THE OBJECTS COVERED: TEXT, VIDEO, AUDIO DATA, LINK ID TO OTHER DATA |

64

| CONTENTS ID | AV CONTENTS ID NO. |
|---|---|
| INDIVIDUAL ADDITIONAL INFORMATION ID | ID NO. OF THE INDIVIDUAL ADDITIONAL INFORMATION IN THE AV CONTENTS |
| GENERAL-PURPOSE ADDITIONAL INFORMATION ID | ID NO. OF THE GENERAL-PURPOSE ADDITIONAL INFORMATION WITH WHICH THE INDIVIDUAL ADDITIONAL INFORMATION IS CONNECTED |
| INFORMATION GENRE | GENRE TO WHICH THE INDIVIDUAL ADDITIONAL INFORMATION BELONGS; MUSIC, MOVIE, CAR, FINANCE ... |
| INFORMATION SOURCE ID | ID NO. OF THE SOURCE OF INDIVIDUAL INFORMATION |
| INFORMATION REGISTRATION DATE | REGISTRATION DATE OF INDIVIDUAL INFORMATION |
| USER USAGE FEE | CHARGING THE USER WHEN INDIVIDUAL INFORMATION IS USED. |
| PROVIDER USAGE FEE | CHARGING THE PROVIDER WHEN INDIVIDUAL INFORMATION IS USED |
| CLASSIFICATION OF THE ADDITIONAL INFORMATION | DATA FORMAT OF THE ADDITIONAL INFORMATION: 1-TEXT, 2-IMAGE DATA, 3-MUSIC DATA |
| ADDITIONAL INFORMATION | INDIVIDUAL ADDITIONAL INFORMATION DATA REGARDING THE OBJECTS COVERED: TEXT, VIDEO, AUDIO DATA, AND ID LINK TO OTHER DATA |

| PROVIDER ID | ID NO. OF THE INFORMATION PROVIDER |
|---|---|
| PROVIDER NAME | NAME OF THE INFORMATION PROVIDER |
| TOTAL CHARGING | CURRENT ENTIRE CHARMING AMOUNT |

72

| PROVIDER ID | ID NO. OF THE INFORMATION PROVIDER |
|---|---|
| CHARGING TIME AND DATE | TIME AND DATE OF CHARGING PROCESSING EXECUTED |
| CHARGING CLASSIFICATION | CLASSIFICATION OF CHARGING: 1 – AT TIME OF REGISTRATION, 2 – AT TIME OF USING THE INFORMATION |
| CONTENTS ID | ID NO. OF THE AV CONTENTS USED |
| ADDITIONAL INFORMATION ID | ID NO. OF THE INDIVIDUAL ADDITIONAL INFORMATION USED |
| CHARGING FEE | AMOUNT CHARGED AT TIME OF USING THE INFORMATION |

FIG.14

```
<CONTENTS>
 <CONTENTS ID=XXXX>
   <CONTENTS CLASSIFICATION> XXXX </CONTENTS CLASSIFICATION>
   <FORMAT> XXXX </FORMAT>
   <REPRODUCTION TIME> XXXX </REPRODUCTION TIME>
         .
         .
   <SEGMENT NO. = 001>
     <SEGMENT CLASSIFICATION> XXX </SEGMENT CLASSIFICATION>
     <START POSITION> XXX </END POSITION>
         .
         .
     <GENERAL-PURPOSE ADDITIONAL INFORMATION ID=XXX
                                         CLASSIFICATION= SCENE>
       <SCENE NO.= XXX> GENERAL-PURPOSE ADDITIONAL INFORMATION </SCENE>
       <INDIVIDUAL ADDITIONAL INFORMATION ID=XXX
                                         CLASSIFICATION=yyy>
          INDIVIDUAL ADDITIONAL INFORMATION DATA
       </INDIVIDUAL ADDITIONAL INFORMATION>
     </GENERAL-PURPOSE ADDITIONAL INFORMATION>
   </SEGMENT>
   </SEGMENT NO.=002>
         .
         .
   </SEGMENT>
         .
         .
</CONTENTS>
```

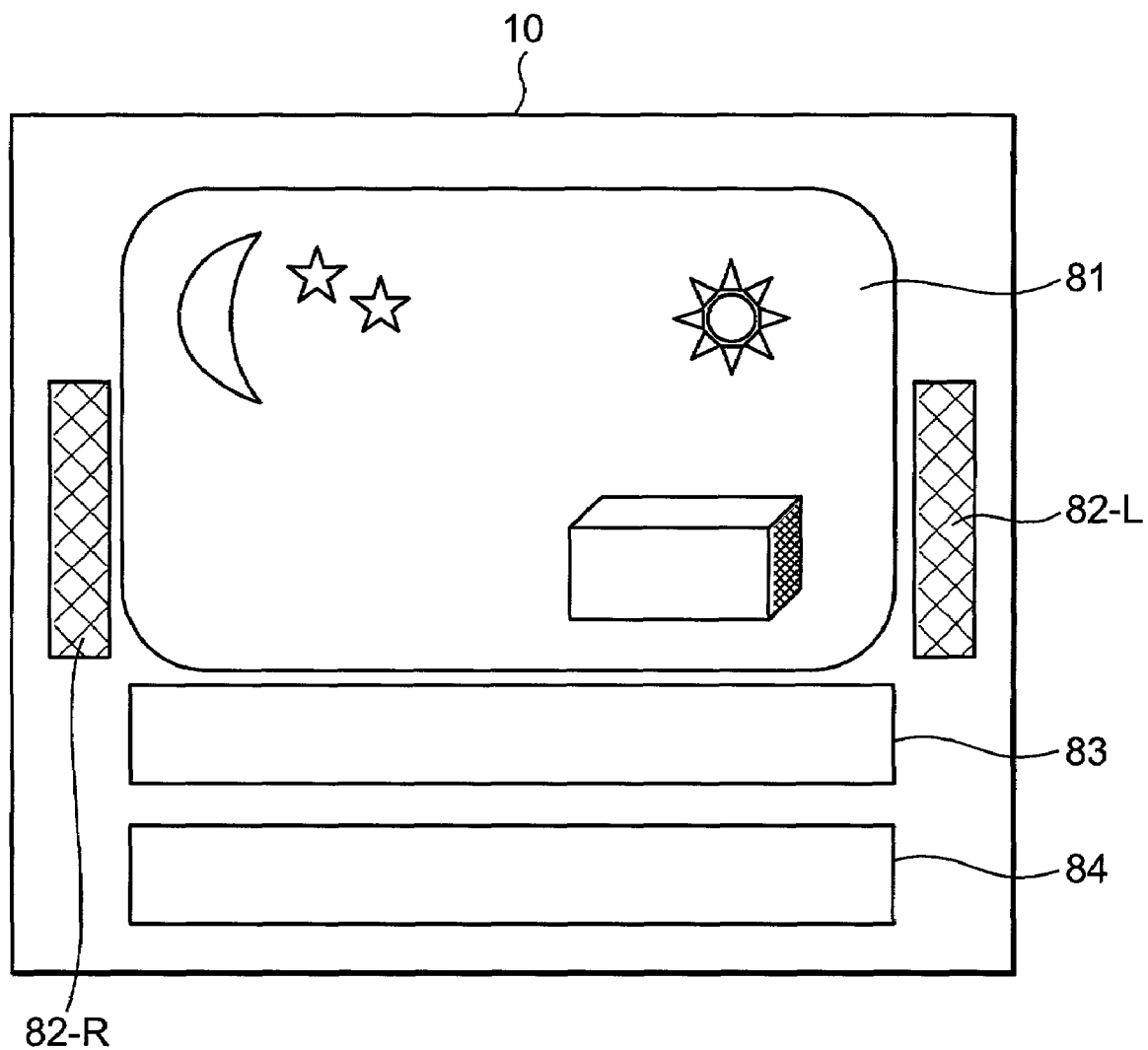

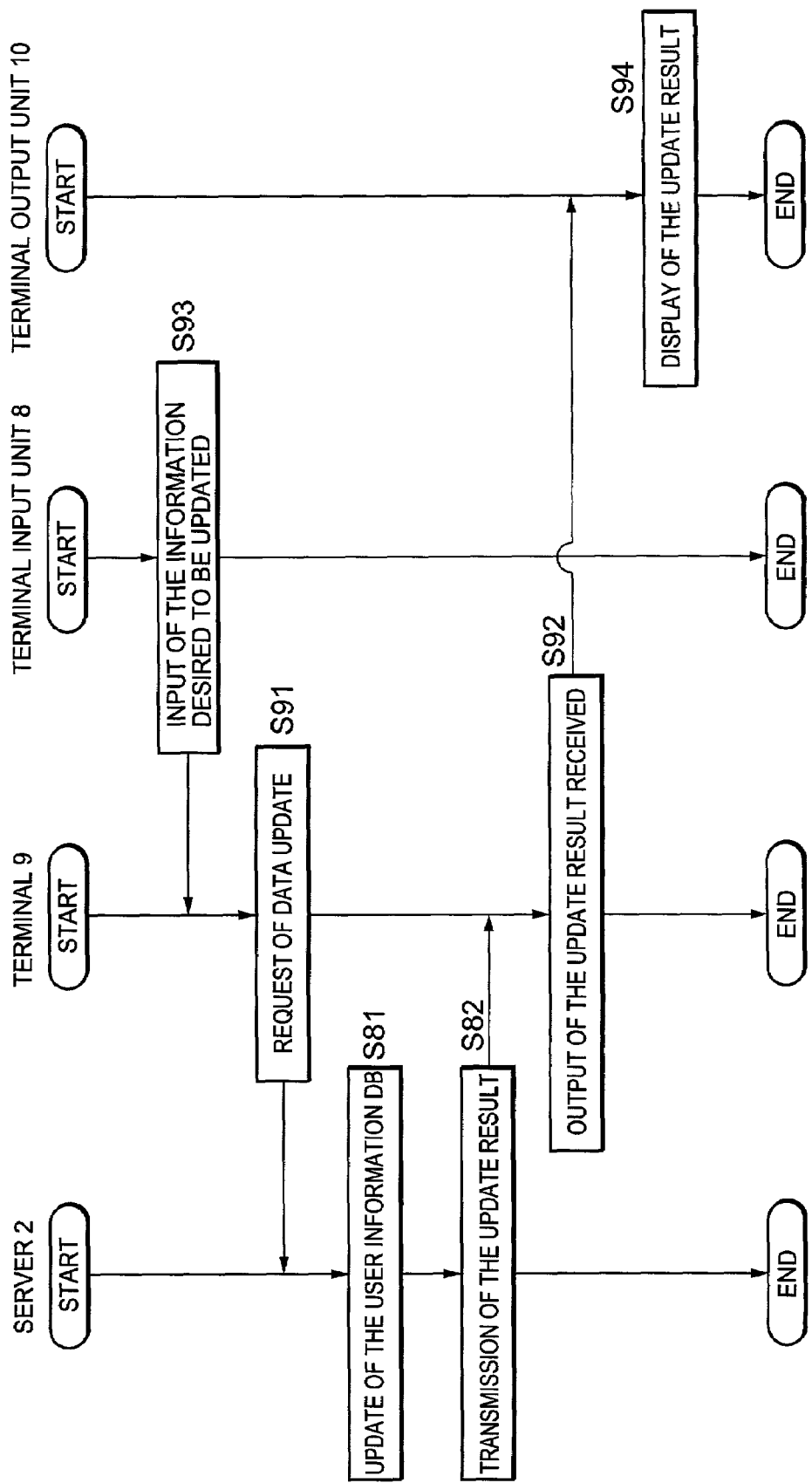

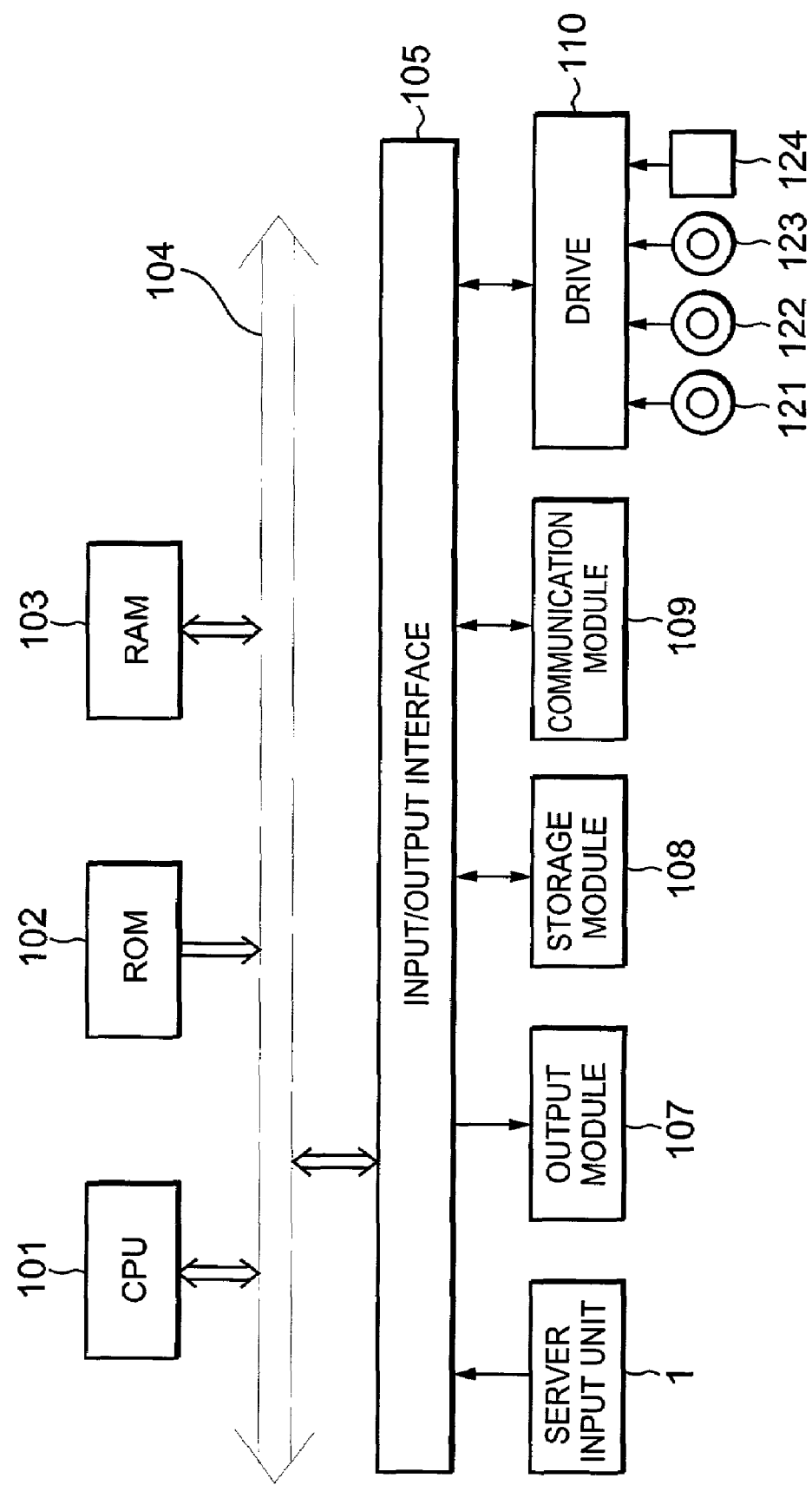

APPARATUS, METHOD, AND SYSTEM FOR INFORMATION PROCESSING, AND RECORDING MEDIUM

BACKGROUND OF THE INVENTION

1. Field of the Invention

The present invention relates to an information processing apparatus and method, an information processing system, and a recording medium, and more particularly, to an information processing apparatus and system, an information processing system, and a recording medium for capable of delivering individual additional information per user together with music data, image data or the like.

2. Description of the Related Art

As a result of development in the Internet technology, video and audio digital signal processing, and video and audio compression techniques, recent years have seen great progress in the technology of delivering video data and audio data (hereinafter referred to as the "AV contents") to each user by using networks.

A common method currently in use for the efficient handling of video and audio data (AV contents) comprises essentially of creating the metadata describing additional information of the AV contents, controls the metadata together with the AV contents, and utilizes them. For example, the EPG (Electronic Program Guide) in a digital broadcasting service or the like is applied such technology.

A standardization work of the metadata, that is, the additional information of the AV contents, is underway, so that many users can efficiently use commonly the metadata.

For instance, the W3C (World Wide Web Consortium) has been in the process of standardizing the XML (Extensible Markup Language), i.e., a general purpose data description language, expandability of which is now drawing much attention. Also, the SMPTE (Society of Motion Picture and Television Engineers) has been developing the metadata standards for a television broadcasting system.

Furthermore, the ISO/IEC (International Organization for Standardization/International Electrochemical Commission) is in the middle stage of developing the MPEG-7 (Moving Picture Experts Group 7) International Standards which provide the data description method of multi-media contents, whereas the metadata of the AV contents can be described and offered to users by using the standard format unifying metadata of the multi-media data, thus enabling users to effectively make mutual use of the AV contents and the additional information.

As a result of the metadata described above, the general purpose additional information such as the title of the AV contents, copyright information, a reproduction time, and a genre can be described.

FIG. 1 gives a schematic example of a conventional delivery and charging system of the AV contents wherein a server 2 is connected via Internet 7 with a terminal apparatus 9 prepared at a user's home.

The server 2 is operated to register the AV contents themselves in an AV contents DB(Data-Base) 5 and to manage them. An administrator of the server 2, while referring to the AV contents DB5, operates a server input unit 1 to input the general purpose additional information of the AV contents, and to register thus entered general purpose additional information into a general purpose additional information DB3, and, at the same time, the administrator of the server 2 operates the server input unit 1 to input a user information to register such user information into a user information DB4.

Based on a delivery request transmitted from the terminal apparatus 9 via the Internet 7, the server 2 also is operated to refer to the user information DB4, to extract necessary information from the general purpose additional information DB3 according to the user information thereof, to create common metadata according to the extracted data for delivery of additional information, and to store temporarily the data into a common metadata DB6. The common metadata temporarily stored are delivered via the Internet 7 to the terminal apparatus 9 together with the AV contents.

The general purpose additional information DB3 stores the registered information and the additional information of the AV contents. The additional information is the type of information which is inherent to the AV contents common among users and, e.g., an identification (ID) No., a format, a reproduction time, a storage location, a title, a genre, and a copyright. The user information DB4 stores information relating to the users such as usage status. The AV contents DB5 stores the AV contents themselves such as movie, still video, and audio. The common metadata DB6 temporarily stores the common metadata of the AV contents.

A terminal input unit 8 is operated to input commands such as delivery request commands as well as commands for causing the terminal apparatus 9 to execute necessary processing. The terminal apparatus 9 integrally and synchronously outputs the AV contents and the common metadata, which are delivered via the Internet 7, to a terminal output unit 10. The terminal output unit 10 reproduces and displays the video data and the audio data corresponding to the AV contents supplied from the terminal apparatus 9 together with the general purpose additional information.

An individual additional information providing unit 11 creates individual additional information per user and provides the individual additional information to the terminal apparatus 9 via a separate channel different from the delivery channel of the server 2. The individual additional information is the information inherent to the users who have desires of needs, and such as advertisement of appliances and personality appearing in the AV contents, deployment of a story, contents of a service, advertisement by means of conversation, and pay information offered to the user in return for payment of information fee to the information provider.

Next, referring to a flowchart in FIG. 2, delivery processing of the conventional delivery and charging system shown in FIG. 1 will be described.

In step S1, the server input unit 1 is operated by the administrator of the server 2 to input the registering information and the additional information of the AV contents. This additional information is inherent to the common AV contents among the users, e.g., an identification No., a format, a reproduction time, a storage location, a title, a genre, and a copyright. In step S2, the server 2 is operated to register the inputted registering information and the additional information of the AV contents into the general purpose additional information DB3.

In step S13, the terminal input unit 8 is operated by the user of the terminal apparatus 9 to input an usage request command for the desired AV contents. In step S11, based on the inputted usage request command for the desired AV contents, the terminal apparatus 9 is operated to request to the server 2 via the Internet 7 for using the specified AV contents.

In step S3, the server 2 receives the request for using the specified AV contents, and based on the request, refers to the usage status of the user information DB4, the server 2 performs processing of charging fee for using the requested AV contents data, and then updates the database.

In step S4, the server 2, based on the user information, refers to the general purpose additional information DB3, and extracts necessary data. In step S5, the server 2 creates the common metadata for delivering the additional information from the data extracted in the processing of step S4 and delivers the metadata together with the AV contents to the terminal apparatus 9 via the Internet 7.

In step S12, the terminal apparatus 9 receives the delivered metadata common with the AV contents and integrally and synchronously outputs the received data to the terminal output unit 10. In step S14, the terminal output unit 10 reproduces and displays the video data and the audio data corresponding to the AV contents supplied from the terminal apparatus 9 together with the general purpose additional information.

In the foregoing manner, the conventional delivery and charging system is able to deliver the common metadata describing the AV contents and the additional information to the user terminal.

Now, if the delivery and charging system is to provide more effective services, it is desirable that not only delivery of the general purpose additional information common among the users but also other services such as delivery of individual information per user and delivery of advertising information by specified corporations for their benefits and for commercial purposes.

Such information may conceivably include pay information which is offered as the user pays the information fee to the information provider. Consequently, insofar as the users are concerned, there are necessary information and unnecessary information or information on interest and information of no interest. Accordingly, there is a definite need for any delivery and charging system to provide information individually per user.

In a case of currently available delivery and charging system as shown in FIG. 1, the individual additional information providing unit 11 creates the individual additional information per user and provides the information as a textual material or electronic data to the user by postal service mail or other network.

Nonetheless, in the existing delivery and charging system shown in FIG. 1, the individual additional information providing unit 11 is separately or independently provided from the server 2 for delivering the AV contents, so that it is difficult to deliver the individual additional information per user together with the general purpose additional information of the AV contents. Hence, the user would have difficulty to integrally use the AV contents and the individual additional information.

Further in the conventional delivery and charging system, the usage status of the individual additional information and the charging information for the usage are not linked to the usage status of the AV contents, so that such information as the usage status and the charging information are unable to be managed by a single system.

As is apparent from the foregoing explanation, the following problems would occur if the conventional delivery and charging system is used:

1. The server is unable to totally manage the usage status of the AV contents and the individual additional information in integrated form, hence, it is impossible to easily recognize these statuses of usage.

2. Also, the server is incapable of providing efficiently the individual additional information, which is an advertisement of a specified appliance, exclusively to the users who frequently use the AV contents related thereto as well as other users who are interested in such information.

3. Further, the server cannot conduct an integrated management of charging (billing) or reverse charging (paying) in keeping with the specified additional information provider and the level of usage of the user of that information in relation to the usage of the AV contents.

4. The additional information upon registration of the AV contents is a description of the additional information relating to general contents of the AV contents and such is shared by many users. Consequently, it is not possible for the user to select and use a particular additional information that the user is interested in.

5. Furthermore, since the individual additional information (e.g., advertising of interesting contents) is provided through a different channel, the user cannot use the information simultaneously when watching the AV contents.

6. In addition, it is necessary for the user to separately manage the charging regarding the usage of the AV contents and the charging regarding the individual additional information supplied by the specified information provider.

7. In the existing delivery and charging system, the individual additional information (e.g., advertisement regarding the specified AV contents) is provided by a channel different from that of the AV contents, so that the user is unable to efficiently and simultaneously use the AV contents and the individual additional information. Even if the user should be interested in that advertisement, the advertising effect would be diminutive. Also, in the case of delivering the individual additional information together with the AV contents, since it is provided indiscriminately to the user who is not interested in that advertisement, the advertising effect would be insignificant and the user would suffer inconvenience.

The present invention addresses the foregoing problems. In delivering the metadata describing the AV contents and the additional information thereof, it purports to describe the individual additional information in the metadata thereof, thus making it possible to deliver the data efficiently together with the AV contents

SUMMARY OF THE INVENTION

Accordingly, an object of the present invention is to provide an information processing apparatus which can obviate the aforementioned problems and which enables the individual additional information to be delivered per user together with the AV contents.

An information processing apparatus according to the present invention comprises essentially of first registration means for registering additional information regarding the contents data, second registration means for registering the individual additional information on the contents data based on the additional information registered by the-first registration means, storage means for storing the additional information registered in the first registration means and the individual additional information registered by the second registration means, extraction means which, when a delivery request is received from other apparatus, according to said delivery request, extracts the additional information and the individual additional information which are stored in the storage means, generation means for generating individual data, which are extracted by the extraction means from the additional information and the individual additional information, to be transmitted to other apparatus, and transmission means for transmitting individual data generated by the generation means, together with the contents data, via network to other apparatus.

An information processing apparatus according to the present invention makes it possible to set up recording means for recording charging information based on the individual data generated by the generation means.

In the first registration means, the contents data can be split per segment, scene or object, and respective additional information can be registered.

In the second registration means, it may be so arranged that the individual additional information can be respectively registered per segment, scene, or object which is obtained by the splitting in the first registration means.

The storage means is a database comprising a plurality of information regions.

An information processing method according to the present invention comprises: a first registration step of registering additional information regarding the contents data; a second registration step of registering the contents data and the individual additional information on the contents data based on the additional information registered by processing of the first registration step; a storage control step of controlling the storage of the additional information registered by processing of the first registration step and the individual additional information registered by processing of the second registration step; an extraction step which, when a delivery request is received from other apparatus, according to said delivery request, extracts the additional information and the individual additional information, storage of which is controlled by the storage control step; a generation step of generating individual data, which are extracted by the processing of the extraction step from the additional information and the individual additional information, to be transmitted to other apparatus; and a transmission step of transmitting individual data generated by processing of the generation step together with the contents data via network to other apparatus.

A program recorded in a recording medium of the information processing apparatus according to the present invention includes: the first registration step of registering the additional information regarding the contents data; the second registration step of registering the contents data and the individual additional information on the contents data based on the additional information registered by the processing of the first registration step; the storage control step of controlling the storage of additional information registered by the processing of the first registration step and the individual additional information registered by the processing of the second registration step; the extraction step which, when a delivery request is received from other apparatus, according to said delivery request, extracts additional information and the individual additional information, storage of which is controlled by the storage control step; the generation step of generating individual data, which are extracted by the processing of the extraction step from the additional information and the individual additional information, to be transmitted to other apparatus; and the transmission step of transmitting individual data generated by the processing of the generation step together with the contents data via network to other apparatus.

In the program stored in the information processing apparatus, the information processing method, and the recording medium according to the present invention, the additional information and the individual additional information regarding the contents data are stored, so that when a delivery request is received from other apparatus, the additional information and the individual additional information in storage are extracted based on the delivery request, individual data generated from the extracted additional information and individual additional information, wherein the individual data is transmitted together with the contents data to other apparatus via network.

An information processing system according to the present invention is composed of a first information processing apparatus having the first registration step of registering the additional information regarding the contents data; the second registration step of registering the contents data and the individual additional information on the contents data based on the additional information registered by the first registration step; the storage step of storing the additional information registered by the first registration step and the individual additional information registered by the second registration step; the extraction step which, when a delivery request is received from a second information processing apparatus, according to said delivery request, extracts the additional information and the individual additional information, storage of which is controlled by the storage control step; the generation step of generating individual data, which are extracted by the extraction step from the additional information and the individual additional information, to be transmitted to the second information processing apparatus; and the transmission step of transmitting individual data generated by the generation step, together with the contents data, via network to the second information processing apparatus; and the second information processing apparatus having a delivery request step of transmitting to the first information processing apparatus information specifying the contents data so as to receive the desired contents data and for requesting a delivery of the desired contents data there-from, and an output step of receiving the contents data and the individual data supplied there-from and for integrating and outputting these data.

In the information processing system according to the present invention, there is provided the first information processing apparatus wherein the additional information regarding the contents data and the individual additional information are stored, so that when a delivery request is received from other apparatus, the additional information and the individual additional information in storage are extracted based on the delivery request, individual data being generated from the extracted additional information and individual additional information, the individual data being transmitted, together with the contents data, via network to the second information processing apparatus, wherein a request for delivering the specified contents data is forwarded to the first information processing apparatus from which the contents data and the individual data are received, these data being integrated and outputted.

BRIEF DESCRIPTION OF THE DRAWINGS

The present invention will be more particularly described with reference to the accompanying drawings, in which:

FIG. 11 is a diagram explaining the detailed structure of a user information DB4;

FIG. 12 is a diagram explaining the detailed structure of an additional information master DB21;

FIG. 13 is a diagram explaining the detailed structure of a provider charging information DB22;

FIG. 14 is a diagram explaining the file description format of individual metadata;

FIG. 19 is a diagram explaining a terminal output unit 10;

FIG. 20 is a flowchart explaining user information update processing executed by the server 2 of FIG. 3; and FIG. 21 is a block diagram explaining an example of the construction of the server 2.

DETAILED DESCRIPTION OF THE PREFERRED EMBODIMENTS

Figure 3:
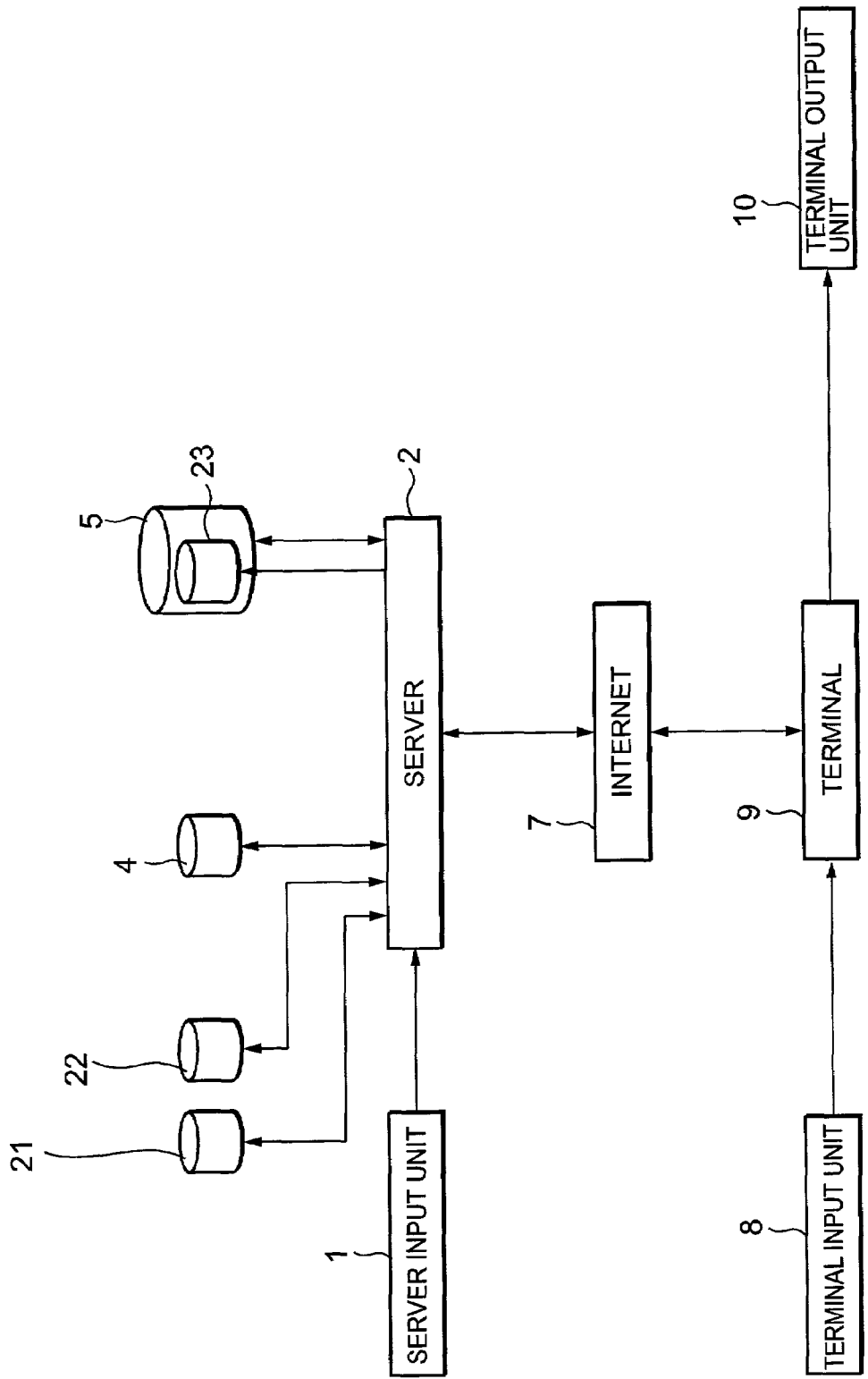
FIG. 3 is a block diagram showing an example of a delivery and charging system according to the present invention.

Embodiments of the present invention will be described below with reference to the accompanying drawings. An example of a structure of a delivery and charging system according to an embodiment of the present invention is shown in FIG. 3. It should be noted that the portions of FIG. 3 corresponding to the conventional case are marked with the same reference characters, so that explanation of the portions having the same reference characters is omitted as necessary.

Figure 1:
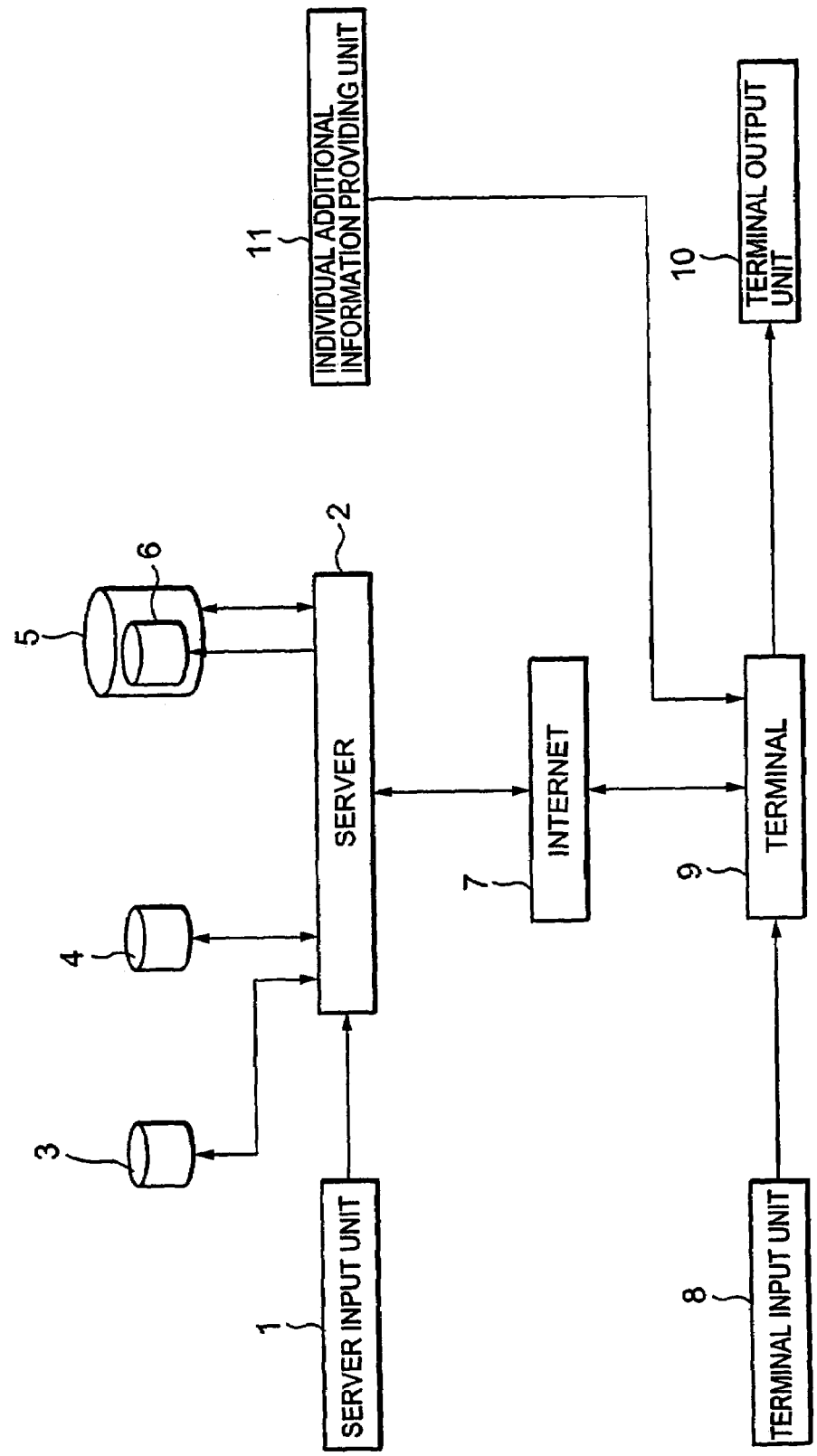
FIG. 1 is a block diagram showing an example of the structure of a conventional delivery and charging system.
Figure 2:
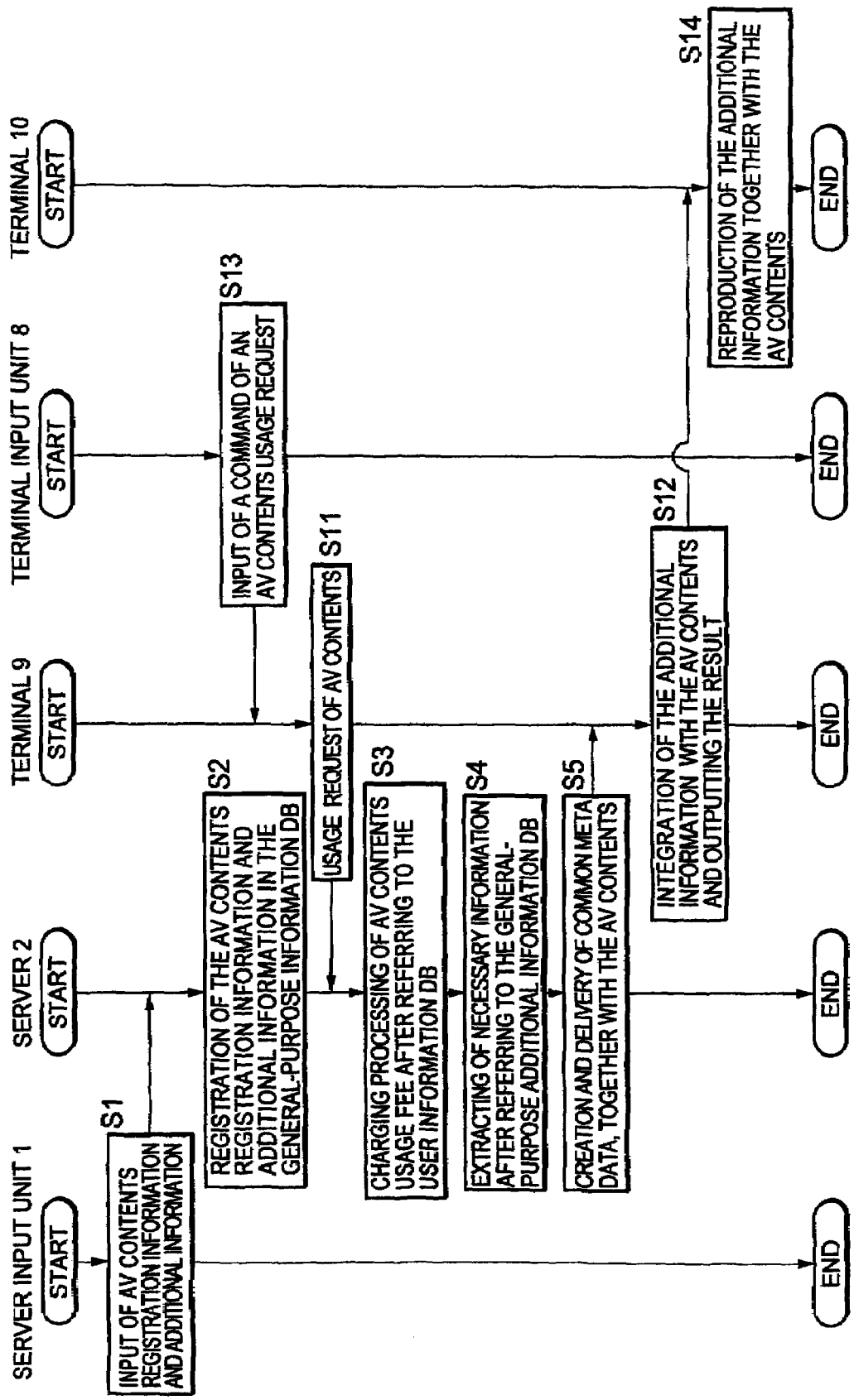
FIG. 2 is a flowchart explaining delivery processing of the delivery and charging system of FIG. 1.

In this delivery and charging system, an additional information master DB(Data-Base) 21 and a provider charging information DB22 are provided in lieu of the general purpose additional information DB3, and an individual data DB23 is provided in lieu of the common metadata DB6. Further the individual additional information provider unit 11 is omitted and the other structures are the same as the structures of the conventional example as shown in FIG. 1.

The administrator of the server 2, while referring to the AV contents DB5, operates the server input unit 1 to input the general purpose additional information and the individual additional information of the AV contents for storage into the additional information master DB21. The server 2 further extracts necessary data from the additional information master DB21 according to a delivery request transmitted from the terminal apparatus 9 via the Internet 7, creates individual metadata for delivering the additional information from thus extracted data, and then delivers thus generated individual metadata via the Internet 7 to the terminal apparatus 9 together with the AV contents after temporarily stored in the individual metadata DB23.

The additional information master DB21 stores overall information of the AV contents, additional information of each segment obtained by splitting contents of the AV contents into plural segments in terms of contextual pause and another additional information regarding objects of various information for each scene and appearing in the segment. The segment refers to, for example, an interval partitioned per scene containing several coherent elements in the movie data, and the object refers to an objects, persons, background sound, effect sound, conversation or a service that appears in the segment or in the scene.

The provider charging information DB22 stores the charging information pertaining to the provider of the AV contents and their additional information. For instance, if the stored charging information is in a negative value, it constitutes a reverse charging (paying) and if it is a positive value, it constitutes charging (billing).

The individual metadata DB23 temporarily stores the individual metadata created by the server 2. The details of the file description format of the individual metadata will be described later.

Figure 4:
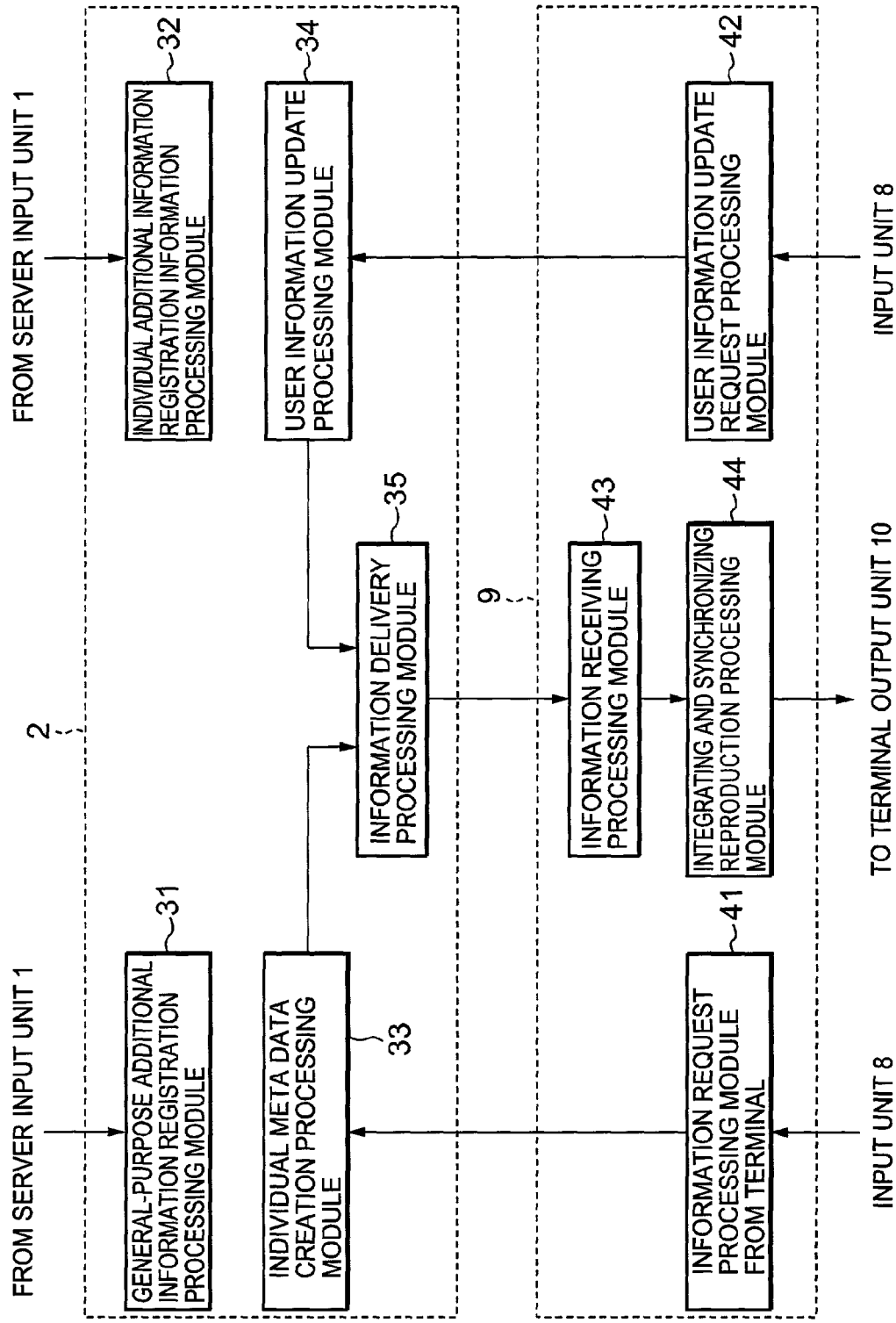
FIG. 4 is a block diagram showing an example of the structure of a server 2 and a terminal apparatus 9.

FIG. 4 is a block diagram showing the detailed structure of the server 2 and the terminal apparatus 9. The server 2 is composed of a general purpose additional information registration processing module 31, an individual additional information registration processing module 32, an individual metadata creation processing module 33, an information delivery processing module 34, and a user information update processing module 35, while the terminal apparatus 9 is composed of an information request processing module 41, a user information update request processing module 42, an information reception processing module 43, and an information integrating and a synchronous reproduction processing module 44.

Now, referring to FIG. 5 to FIG. 10, description is sequentially done from the general purpose additional information registration processing module 31 to the user information update processing module 35 and from the information request processing module 41 to the information integrating and the synchronous reproduction processing module 44.

Figure 5:
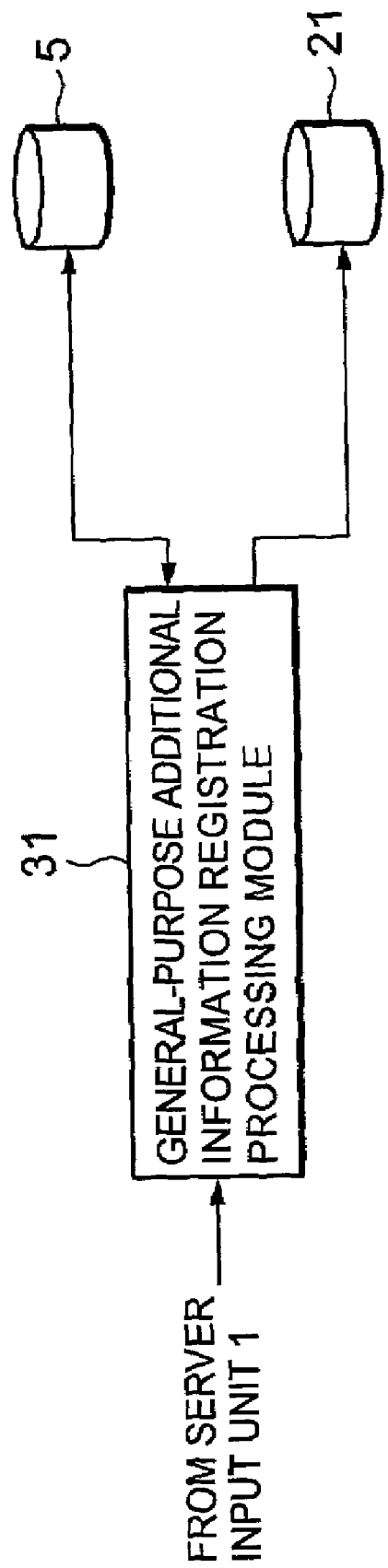
FIG. 5 is a diagram explaining the detailed structure of a general purpose additional information registration processing module 31.

FIG. 5 is a diagram explaining the detailed structure of the general purpose additional information registration processing module 31.

The general purpose additional information registration processing module 31 registers the AV contents such as movie, still video and audio into the AV contents DB5. The administrator of the server 6, while referring to the AV contents DB5, inputs information relating to the AV contents by using the server input unit 1. This enables the general purpose additional information registration processing module 31 to add or register the overall registration information and the additional information of the AV contents to the additional information master DB21 according to the input from the server input unit 1. At this instant, the general purpose additional information registration processing module 31 also adds the number of splits or the number of segments obtained when the AV contents are split into a plurality of intervals or segments based on the context. The additional information, in this instance, means the additional information of the overall AV contents such as a title, a type, a copyright, a genre, a registration number, a date of creation, a storage location, a storage format, data size, reproduction time or the like.

Figure 6:
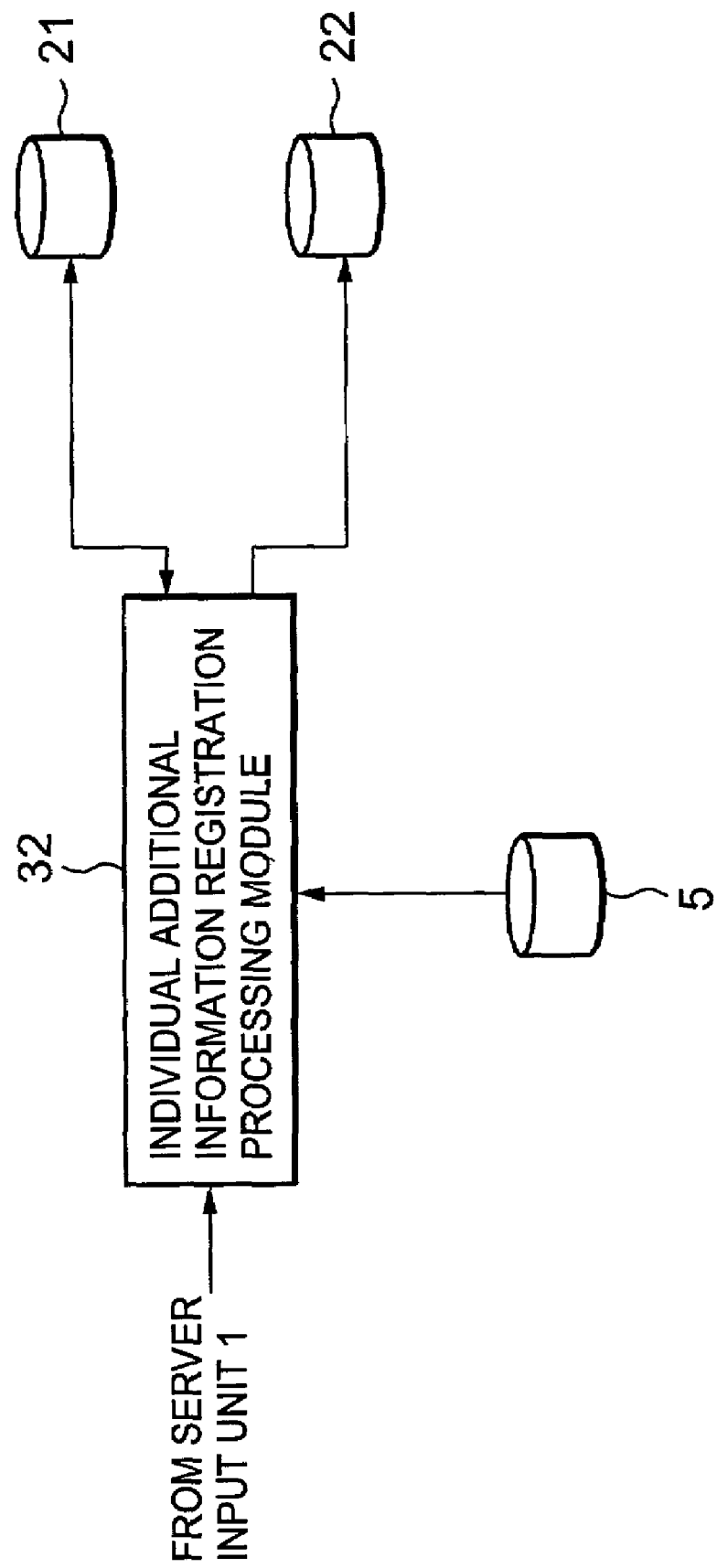
FIG. 6 is a diagram explaining the detailed structure of an individual additional information registration processing module 32.

FIG. 6 is a diagram explaining the detailed structure of the individual additional information registration processing module 32.

The individual additional information registration processing module 32, while referring to the additional information master DB21, reads out the registered additional information of the AV contents. The administrator of the server 6, while referring to the read out additional information of the AV contents as well as the contents of the AV contents registered in the AV contents DB5, sequentially inputs the overall individual additional information regarding the AV contents, the individual additional information per segment of the AV contents, and the individual additional information per scene in the segment or per object by using the server input unit 1. This enables the individual additional information registration processing module 32 to update or register the individual additional information to the additional information master DB21. Also, depending on the number of pieces of registered information and their contents, the individual additional information registration processing module 32 registers the charging information of the AV contents providers in the provider charging information DB22.

Figure 7:
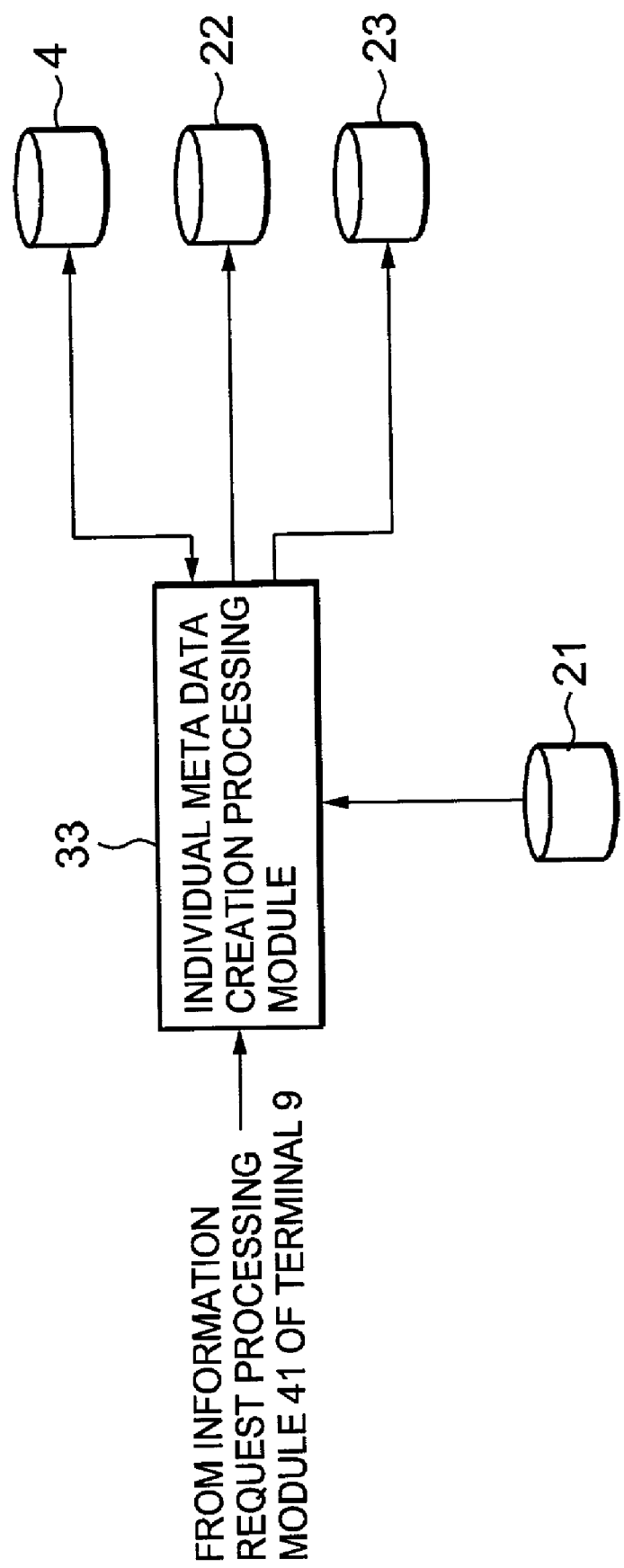
FIG. 7 is a diagram explaining the detailed structure of an individual metadata creation processing module 33.

FIG. 7 is a diagram explaining the detailed structure of the individual metadata creation processing module 33.

The individual metadata creation processing module 33 analyzes the delivery request message sent from the information request processing module 41 of the terminal apparatus 9 and identifies the designated AV contents ID No., User ID No., and the classification of the user's additional information delivery request. Also, from the contents ID. No. which is the result of the analysis, the individual metadata creation processing module 33 extracts the appropriate additional information of the AV contents by referring to the additional information master DB21, while, at the same time, reads out the data such as the usage status of the proper user and usage classification from the user ID No., by referring to the user information DB4.

Also, on the basis of the read-out data, the individual metadata creation processing module 33 extracts the individual additional information from the additional information master DB21, creates the individual metadata per user, and stores the same temporarily in the individual metadata DB23. Further, the individual metadata creation processing module 33, based on the created individual metadata, updates the charging information of the provider charging information DB22.

The information request processing module 41, based on the input from the terminal input unit 8, transmits a command to request a delivery of the desired AV contents, i.e., the contents information such as a title and a classification of degree of detail of the additional information, to the individual metadata creation processing module 33 of the server 2 via the Internet 7.

Figure 8:
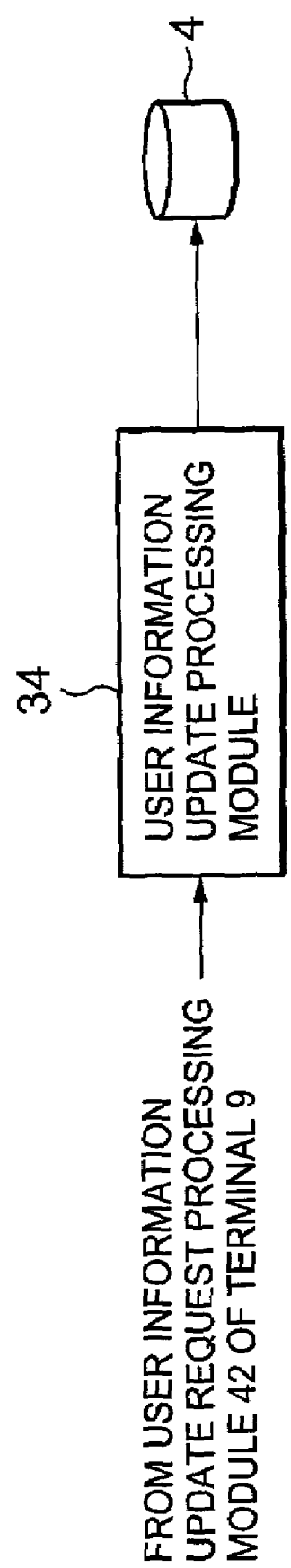
FIG. 8 is a diagram explaining the detailed structure of a user information update processing module 34.

FIG. 8 is a diagram explaining the detailed structure of the user information update processing module 34.

The user information update processing module 34 receives the update request, such as for the user classification and the degree of detail, the genre or the like of the additional information to be provided, transmitted from the user information update request processing module 42 of the terminal apparatus 9, and based thereon, updates the data of the user information in the user information DB4. In addition, the user information update processing module 34 supplies the updated result to the information delivery processing module 35.

The user information update request processing module 42, based on the input from the terminal input unit 8, transmits a command to request an updating of the user information to the user information update processing module 34 of the server 2 via the Internet 7.

Figure 9:
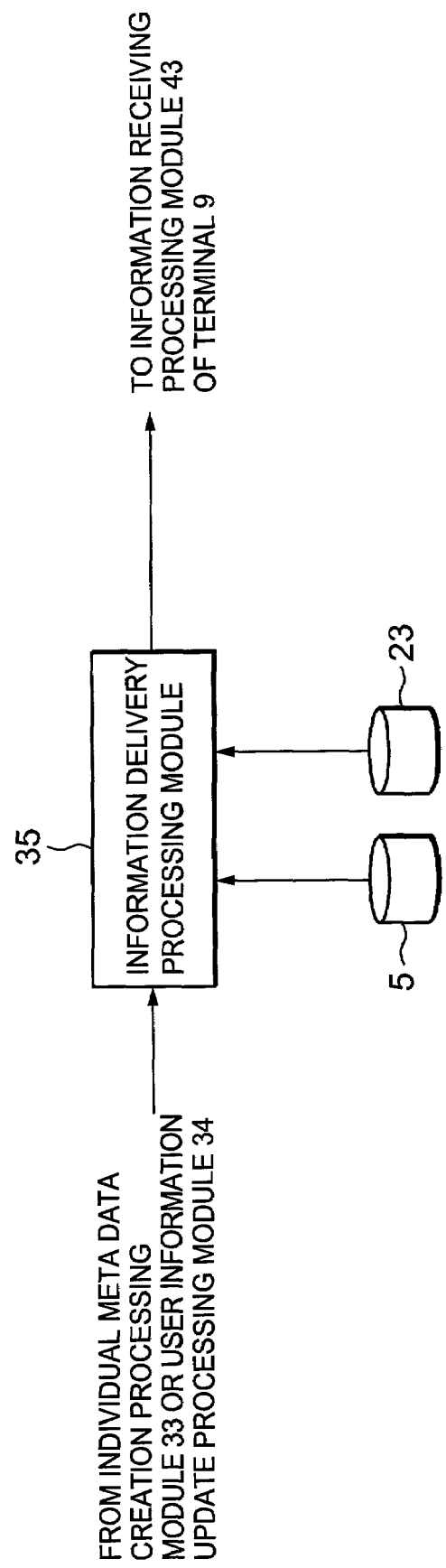
FIG. 9 is a diagram explaining the detailed structure of an information delivery processing module 35.

FIG. 9 is a diagram explaining the detailed structure of the information delivery processing module 35.

The information delivery processing module 35, upon receipt of the end command of the individual metadata creation processing from the individual metadata creation processing module 33, reads out the AV contents requested delivery through the terminal apparatus 9, from the AV contents DB5, while, at the same time, reads out the individual metadata created in the individual metadata creation processing module 33 and temporarily stored in the individual metadata DB23. The AV contents and the individual metadata thus read out are delivered via the Internet 7 to the information reception processing module 43 of the terminal apparatus 9. The information delivery processing module 35 also delivers the user information update results supplied from the user information update processing module 34 via the Internet 7 to the information reception processing module 43 of the terminal apparatus 9. It should be mentioned that the available delivery methods include a batch delivery or real-time delivery.

The information receiving processing module 43 receives the AV contents and their individual additional information or the user information update result delivered via the Internet 7 from the server 2, and supplies these pieces of information to the information integration and synchronous reproduction processing module 44.

Figure 10:
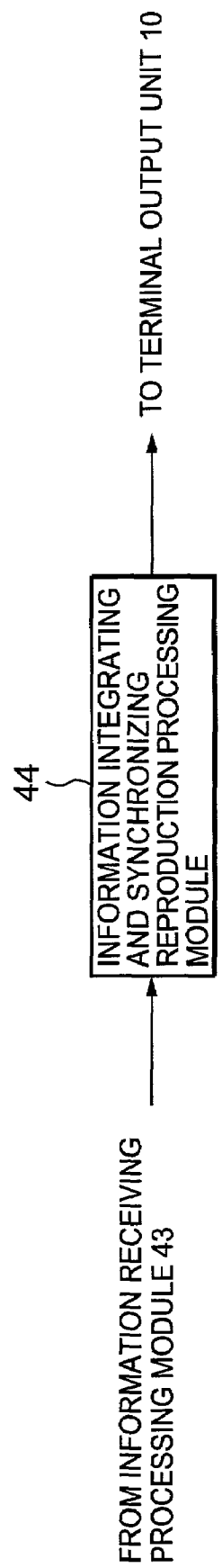
FIG. 10 is a diagram explaining the detailed structure of an information integrating and synchronous reproduction processing module 44.

FIG. 10 is a diagram explaining the detailed structure of the information integrating and synchronous reproduction processing module 44.

The information integrating and synchronous reproduction processing module 44 integrates and synchronizes the AV contents, the general purpose additional information of that AV contents, and the individual additional information on the segments, the scenes or the objects of the AV contents received by the information reception processing module 43, and outputs the resultant information to the terminal output unit 10.

Next, an example of the structure of the user information DB4 will be described with reference to FIG. 11. The user information DB4 comprises an integrated information region 51 storing overall user information and a charging detail region 52 recording or storing the charging details pertaining to the user.

The integrated information region 51 comprises the user ID, user name, usage classification, information genre, degree of information details, usage frequency, total charging or the like.

In the case of an example illustrated in FIG. 11, the user ID stands for the ID No. identifying the user. The user name represents an appellation or full name. The usage classification indicates a usage classification of the user, e.g., by a type of membership. The information genre shows the information genre of the individual additional information which the user desires. The usage frequency represents the usage status in terms of user genre. The total charging shows the current total charging amount of the user.

The charging detail region 52 comprises the user ID, the charging time and date, the contents ID, the additional information ID, the charging fee or the like.

In the case of an example presented in FIG. 11, the user ID indicates the ID No. for identifying the user. The charging time and date show the time and date of charging processing. The contents ID establishes the ID No. of the individual additional information used. The charging fee stands for the amount charged for using the AV contents.

It should be noted that the user ID of the integrated information region 51 is linked to the user ID of the charging detail region 52.

Next, referring to FIG. 12, an examples of the structure of the additional information master DB21 will be explained. The additional information master DB21 is composed of a contents information region 61 for storing overall information of the AV contents, a segment information region 62 having information of the AV contents split intervals, a general purpose additional information region 63 wherein the general purpose additional information per segment of the AV contents is registered or stored, and the individual additional information region 64 wherein individual additional information is additionally registered or stored as a supplement to the general purpose additional information.

The contents information region 61 is constituted by the contents ID, the classification, the format, the reproduction time, the registration date, the storage location, the size, the title, the leading role players, the copyright, the usage classification, the additional explanation, the number of segments or the like.

In the case of an example shown in FIG. 12, the contents ID represents an identification number identifying the AV contents. The classification indicates a classification of the AV contents, and for example, the classification "1" for a movie, "2" for a music and "3" for news are respectively allocated. The format shows the data format of the AV contents, and for example, the format "1" for the PCM (Pulse Code Modulation), "2" is for the MPEG-2 (Moving Picture Expert Group), and "3" for the MP3 (MPEG Audio Layer 3) are respectively allocated. The reproduction time shows the reproduction time of the AV contents. The registration date establishes the information registration date of the AV contents. The storage location refers to the storage location of the AV contents, the file pass, the URL (Uniform Resource Locator) or the like. The size represents the data size of the AV contents. The title indicates the title of the AV contents. The leading role player indicates the name of the leading actor or actress. The copyright represents the copyright information of the AV contents. The usage classification gives the partition in which use of the AV contents is allowed. For example, "1" is stored when everyone is permitted to use, and "2" is stored when only the registered members are permitted to use. The additional explanation represents other additional information and explanation regarding the overall AV contents. The number of segments shows the number of splits of the segment intervals of the AV contents.

The segment information region 62 comprises the contents ID, the segment No., the segmentation, the start position, the end position or the like.

In the case of an example in FIG. 12, the contents ID shows the ID No. for identifying the AV contents. The segment No. indicates the No. of a segment. The segmentation refers to a time region or a space region. The start position shows the starting position of a segment. The end position indicates the ending position of a segment.

The general purpose additional information region 63 is composed of the contents ID, general purpose additional information ID, part covered by additional information, name covered by additional information, segment No., scene No., object No., additional information classification, additional information or the like.

In reference to an example in FIG. 12, the contents ID shows the ID No. for identifying the AV contents. The general purpose additional information ID represents the ID No. of the additional information of the AV contents. The subject for the additional information indicates the subject to which the additional information directs its attention. For example, in case of an entire segment, "1" is stored; in case of an entire scene, "2" is stored; or in case of an object, "3" is stored. The name covered by the additional information is the name of that which the additional information addresses, whereby, for example, a "scene of XXX" is stored. The segment No. gives the segment No. to which the additional information directs its attention in the AV contents. The scene No. stands for the scene No. which the additional information addresses in the segment, while the object No. points to the No. of an object appearing in the segment. The additional information classification reveals the data format of the additional information, e.g., "1" is stored in case of text, "2" in case of video data, and "3" in case of music data. The additional information represents the additional information data regarding the objects covered, e.g., text, video, audio data, and the link ID to other data.

The individual additional information region 64 comprises essentially of the contents ID, individual additional information ID, general purpose additional information ID, information genre, partition for degree of detail of information, information source ID, information registration date, user usage fee, provider usage fee, classification of the additional information, additional information or the like.

In the case of an example in FIG. 12, the contents ID shows the ID No. for identifying the AV contents. The individual additional information ID gives the ID No. of the individual additional information in the AV contents. The general purpose additional information ID indicates the ID No. of the general purpose additional information relating to the individual additional information. The information genre represents the genre to which the individual additional information belongs, e.g., music, movie, car or finance. The partition for the degree of detail of information shows the ID to identify the information source or information provider of the individual information. The information registration date gives the registration date of the individual information. The user usage fee indicates charging to the user when the individual information is used. The provider usage fee is charging to the information provider when the individual information is used. The classification of the additional information represents a data format of the additional information. For instance, there are stored "1" in case of text, "2" in case of video data, and "3" in case of music data. The additional information shows the individual additional information data relating to an object, e.g., text, video, audio data, and the link ID to other data.

Now, then, the contents ID of the contents information region 61 is respectively linked to the contents ID of the segment information region 62, the contents ID of the general purpose additional information region 63, and the contents ID of the individual additional information 64, while the general purpose additional information ID of the general purpose additional information region 63 is linked to the general purpose additional information ID of the individual additional information region 64.

Next, referring to FIG. 13, an example of the structure of the provider charging information DB22 will be explained. The provider charging information DB22 is constituted by the integrated charging information region 71 which records or stores the overall charging information on the provider and the charging detail region 72 which records or stores the details of the respective charging information.

The integrated charging information region 71 comprises the provider ID, provider name, total charging or the like.

In case of the example in FIG. 13, the provider ID indicates the ID No. for identifying the information provider. The provider name is the name of the provider (such as a corporate name, a personal name or the like). The total charging represents the current entire charging amount to the information provider.

The charging detail region 72 comprises the provider ID, the charging time and date, the charging classification, the contents ID, the additional information ID, the charging fee or the like.

In case of the example in FIG. 13, the provider ID shows the ID No. for identifying the information provider. The charging time and date indicate the time and date of the execution of charging processing. The charging classification shows the classification of charging. For example, there is stored "1" in case of the time of registration or "2" in case of the time of using the information. The contents ID shows the ID No. of the AV contents used. The charging fee refers to the amount charged when using the information.

Note that the provider ID of the integrated charging information region 71 is linked to the provider ID of the charging detail region 72.

Now, referring to FIG. 14, the file description format of the individual metadata temporarily stored in the individual metadata DB23 will be explained. Insofar as the description format is concerned, that of the metadata in XML is followed. Each piece of information in the individual metadata is identified by a tag (item enclosed in <> in the figure). The information in each tag is described during an interval from the beginning with <> until the ending with </>. Also, if another tag is described in the tag, it shows the hierarchical structure of data. In the figure, the hierarchical structure of the described tag has meaning, but the order of information described has no bearing on the hierarchical structure but merely represents a sequence placed at random.

Take an example in FIG. 14. During an interval from the beginning of the <contents> tag until the ending with the </contents> tag, the additional information regarding the contents is described. A <contents ID=xxxx> tag shows that the ID (xxxx) is an attribute item of the contents which is identified by that ID. In the contents, contents information such as contents classification, format and reproduction time is hierarchically described.

Also, information of each segment of the contents is described from a tag of <segment No.=xxx>. The <segment No.=xxx> tag means that the No. (xxx) is an attribute item of that segment, indicating that the segment is identified by that number. In this segment, segment information such as segmentation, start position and end position is hierarchically described. In the case of FIG. 14, during an interval from the beginning of the <segment No.=001> tag until the ending with the </segment> tag, the additional information regarding each segment of the contents is described.

In addition, in the segment, during an interval from the time a <general purpose additional information ID=xxx segment=scene> tag starts until a </general purpose additional information> tag ends, general purpose additional information of each segment of the contents is described.

The <general purpose additional information. ID=xxx segment=scene> tag means that the ID (xxx) is an attribute item of its general purpose additional information, indicating that the general purpose additional information is identified by that ID and that such general purpose additional information is segmented into "scenes". In this general purpose additional information, there is described the general purpose additional information per scene, object or sound effect as enclosed by respective tags.

Further, during an interval from the start of an <individual additional information ID=xxx segment=yyy> tag until the end of an </individual additional information> tag, the individual additional information regarding that general purpose additional information is described. It is possible for this individual additional information tag to describe a plurality of individual information with respect to the general purpose additional information on one object covered.

Figure 15:
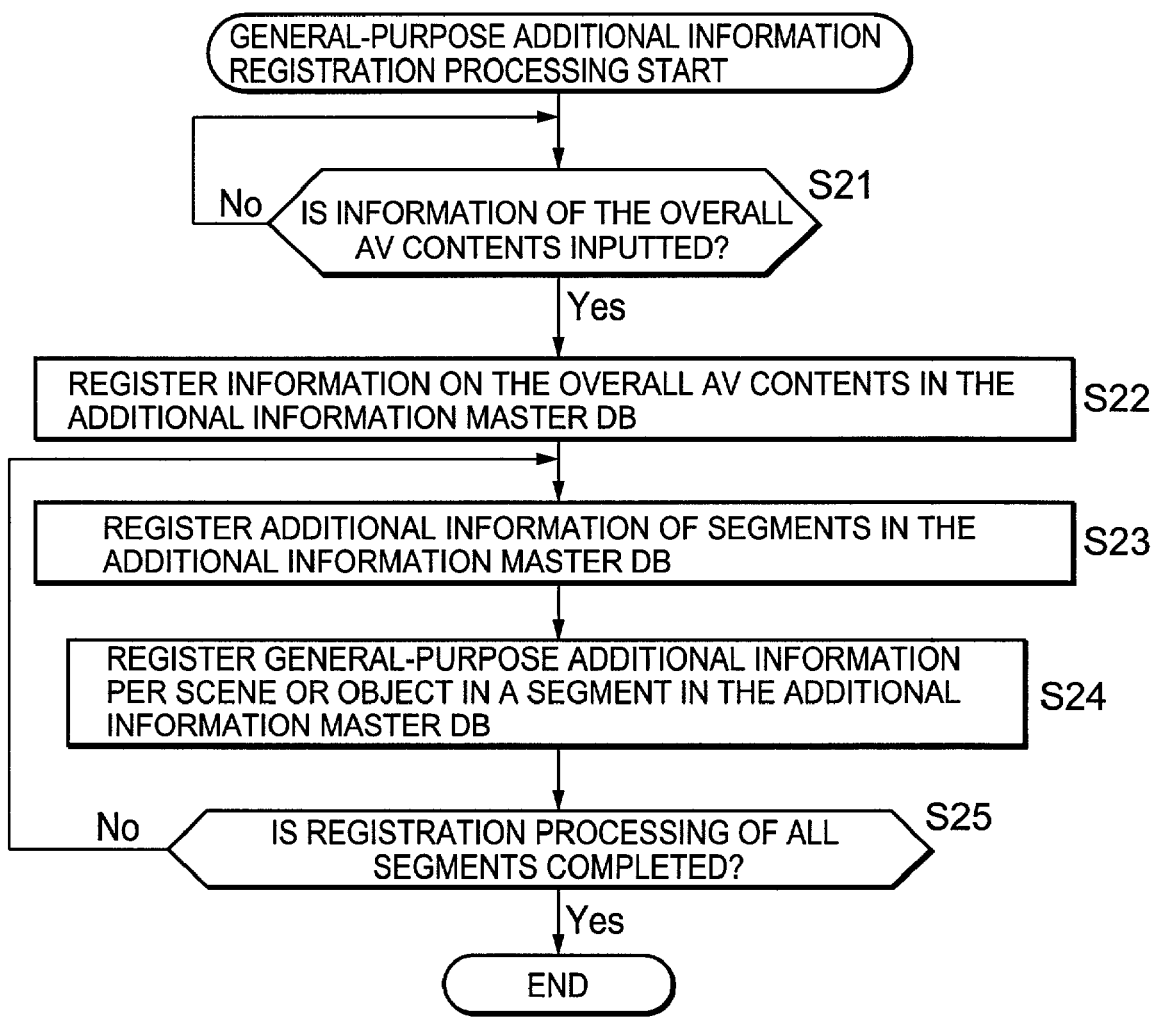
FIG. 15 is a flowchart explaining general purpose additional information registration processing.

General purpose additional information registration processing executed by the general purpose additional information registration processing module 31 will be described next with reference to a flowchart of FIG. 15.

In step S21, the general purpose additional information registration processing module 31 determines whether or not the overall registration information and the additional information on the AV contents are inputted from the server input unit 1, and waits until the overall registration information and the additional information of the AV contents are inputted. And in step S21, if it is determined that the overall registration information and the additional information of the AV contents are inputted, the processing proceeds to step S22 and the general purpose additional information registration processing module 31 registers or stores the overall registration information and the additional information of the AV contents which are inputted in the processing of step 21 in the contents information region 61 (see FIG. 12) of the additional information master DB 21. At this time, the number of splits or segments when splitting the content of the contents data into several intervals in meaning is registered in the contents information region 61.

In step S23, the general purpose additional information registration processing module 31 registers the additional information of segments into the segment information region 62 (see FIG. 12) of the additional information master DB21 per split segment. In case of movie data, the additional information on segments split by a series of consecutive scenes is registered. In the case of music data, another additional information on segments split by a series of consecutive music is registered.

Now, a segment can be split by objects, persons or backgrounds that appear in a scene, and their additional information can also be registered.

In step S24, the general purpose additional information registration processing module 31 registers the general purpose additional information regarding scenes or objects per scene or per object in the segment registered in the processing of step S23 into the general purpose additional information region 63 (see FIG. 12) of the additional information master DB 21.

In step S25, the general purpose additional information registration processing module 31 determines whether or not the registration processing of all segments is completed. And if it is determined that the registration processing of all segments is not completed yet, the processing returns to step S25, where the aforementioned processing is repeated until it is determined that the registration processing of all segments is completed. If it is determined that the registration processing of all segments is completed, the processing is over.

As described above, it is arranged so that additional information is manually inputted by the administrator of the server 2 using the server input unit 1. Nevertheless, there is another processing method, for example, in which an algorithm that can detect a specified scene or music from the content of the AV contents is used to detect one specified scene as well as music, so that the name of the scene and the name of the music that are detected can be automatically registered as additional information.

Figure 16:
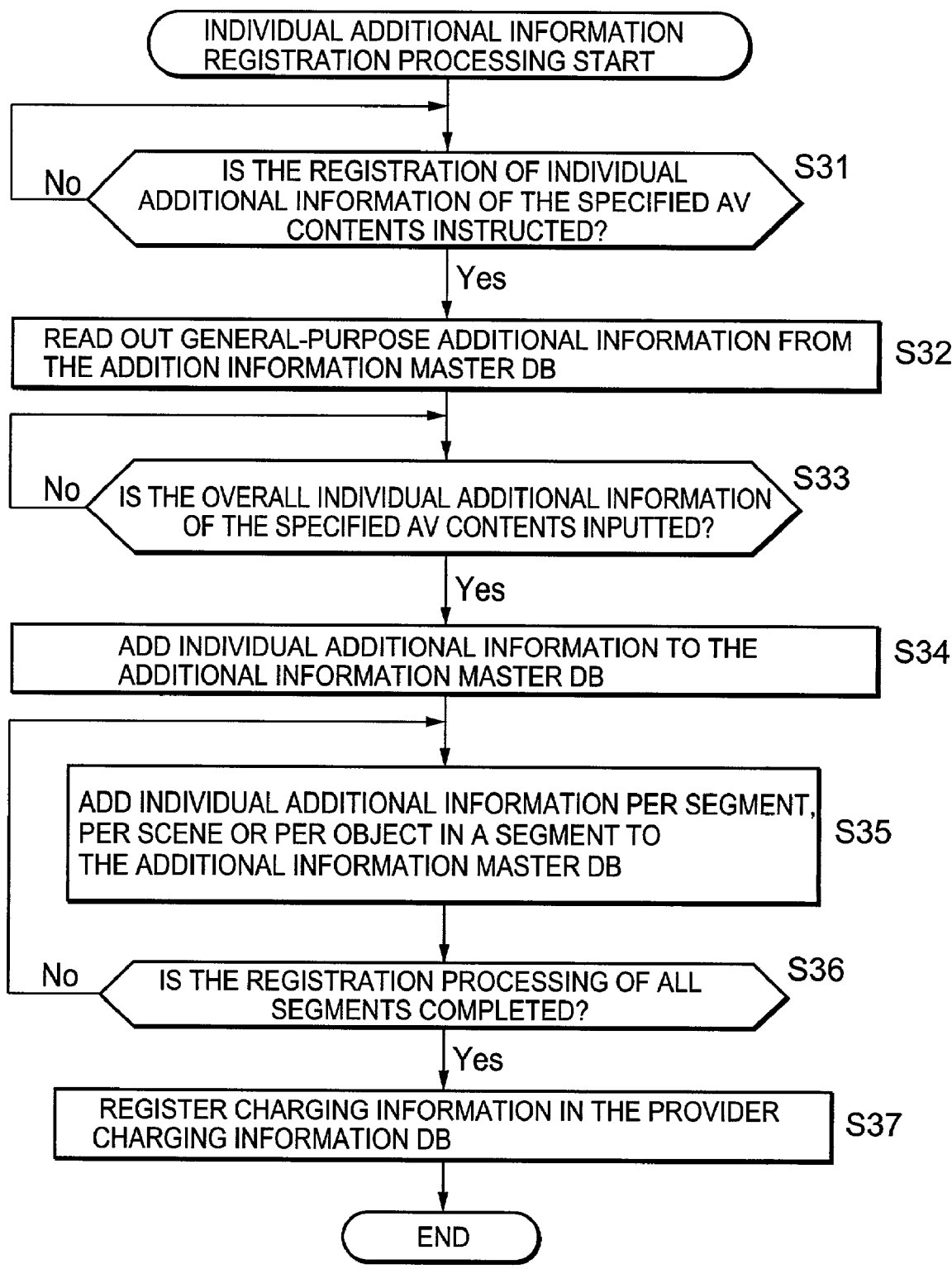
FIG. 16 is a flowchart explaining individual additional information registration processing.

Referring now to a flowchart in FIG. 16, the individual additional information registration processing executed by the individual additional information registration processing module 32 will be described.

In step S31, the individual additional information registration processing module 32 determines whether or not the instructions to register the individual additional information of the specified AV contents from the server input unit 1 are issued, and waits until the instructions to register the individual additional information of the specified AV contents is issued. And in step S31, when it is determined that the instructions to register the individual additional information of the specified AV contents are issued, the processing proceeds to step S32, in which the individual additional information registration processing module 32 reads out the general purpose additional information of the specified AV contents from the general purpose additional information region 63 (see FIG. 12) of the additional information master DB21 instructed registration by the processing of step S31. Then, the administrator of the server 2 inputs the individual additional information by operating the server input unit 1, while referring to the content of the specified AV contents, individual additional information of which is instructed to be registered as well as the content of the general purpose additional information of the read out specified AV contents.

In step S33, the individual additional information registration processing module 32 determines whether or not the overall individual additional information of the specified AV contents is inputted from the server input unit 1, and waits until the overall individual additional information of the specified AV contents is inputted. And in step S33, when it is determined that the overall individual additional information of the specified AV contents is inputted, the processing proceeds to step S34, in which the individual additional information registration processing module 32 adds or stores the overall individual additional information of the specified AV contents, which is inputted in the processing of step S33, to the individual additional information region 64 (see FIG. 12) of the additional information master DB21.

In step S35, the individual additional information registration processing module 32 adds or stores the individual additional information to the individual additional information region 64 (see FIG. 12) of the additional information master DB21 per segment of the specified AV contents, per scene in that segment or per object in that segment,.

In step S36, the individual additional information registration processing module 32 determines whether or not the registration processing of all segments of the specified AV contents is completed. And if it is determined that the registration processing of all segments of the specified AV contents is not completed yet, the processing returns to step S35, where the next segment registration processing is performed. And in step S36, the aforementioned processing is repeated until it is determined that the registration processing of all segments of the specified AV contents is completed. When it is determined that the registration processing of all segments are completed, the processing moves to step S37.

In step S37, the individual additional information registration processing module 32 records the charging information in the total charging information region 71 and the charging detail region 72 (see FIG. 13), depending on the number and contents of the pieces of the individual additional information added in the processing of step S35, then, the processing is over.

Figure 17:
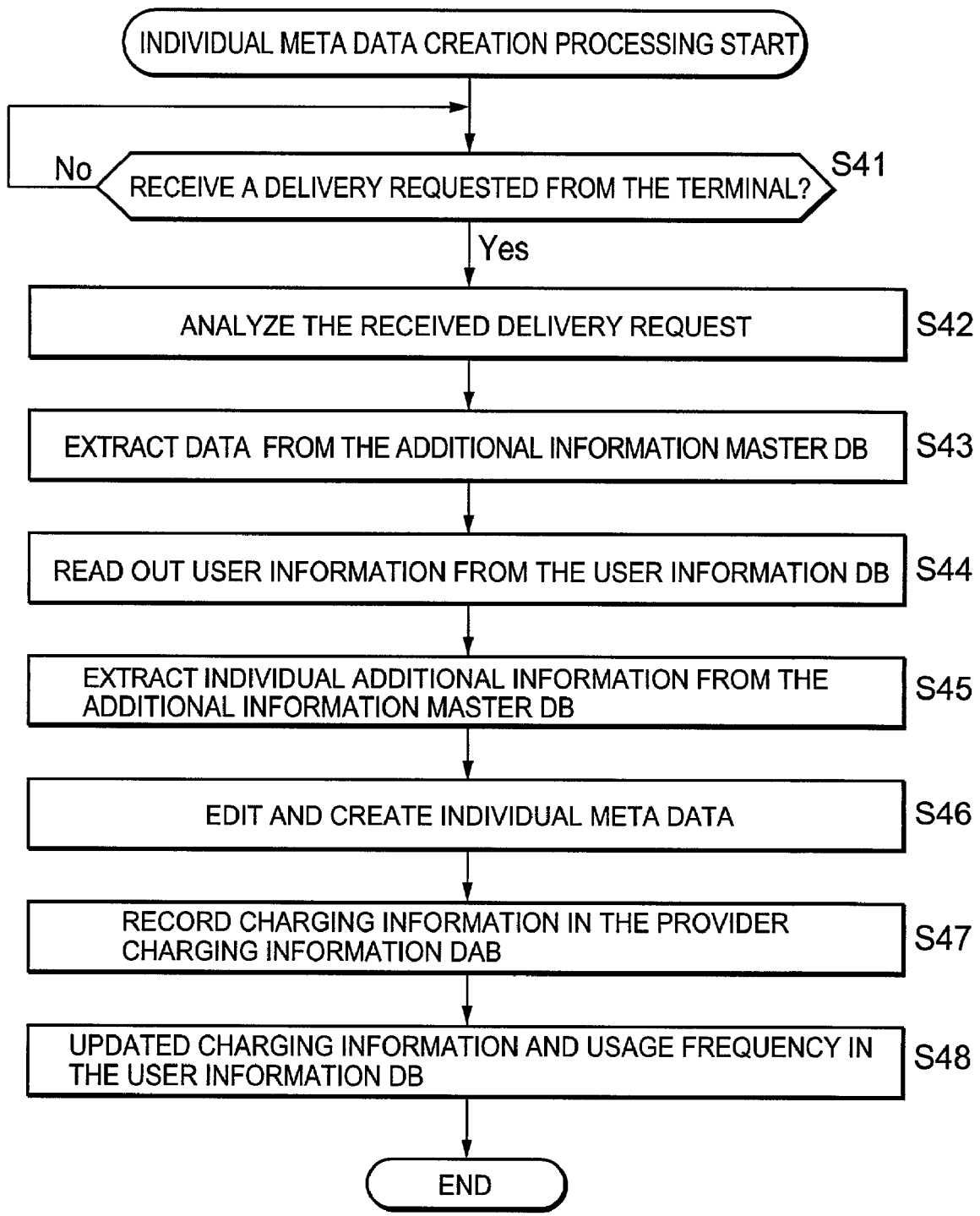
FIG. 17 is a flowchart explaining individual metadata creation processing.

Next, referring to a flowchart in FIG. 17, the individual metadata creation processing executed by the individual metadata creation processing module 33 will be described.

In step S41, the individual metadata creation processing module 33 determines whether or not a delivery request is received from the information request processing module 41 of the terminal apparatus 9 and waits until the delivery request is received. And, in step S41, when it is determined that the same is received, the processing moves to step S42, in which the individual metadata creation processing module 33 analyzes the delivery request message received in the processing of step S41. This enables the ID No. of the specified AV contents, the user ID No., and the classification of the user's additional information delivery request to be identified.

In step S43, in accordance with the message (in this case, identification information of the AV contents) analyzed in the processing of step S42, the individual metadata creation processing module 33 extracts the data corresponding to the specified AV contents ID from the additional information master DB21. Namely, from the contents information region 61 to the general purpose additional information region 63 shown in FIG. 12, the general purpose additional information of the AV contents matching the specified AV contents ID is extracted.

In step S44, according to the message (in this case, identification information of the AV contents) analyzed in the processing of step S42, the individual metadata creation processing module 33 reads out the user information corresponding to the specified user ID from the integrated information region 51 (see FIG. 11) of the user information master DB4, thus making it possible to read out the information genre and the degree of detail of information of the individual additional information desired by the user.

In step S45, according to the user information read out in the processing of step S44, the individual metadata creation processing module 33 extracts the individual additional information of the AV contents needed by the user from the individual additional information region 63 (see FIG. 12) of the additional information master DB21.

In step S46, according to the general purpose additional information of the AV contents extracted in the processing of step S43 and the individual additional information of the AV contents needed by the user which is extracted in the processing of step S45, the individual metadata creation processing module 33 edits and creates the individual metadata. Thereby, for example, the individual metadata of such file description format as shown in FIG. 14 is created and temporarily stored in the individual metadata DB23.

In step S47, according to the individual metadata created in the processing of step S46, the individual metadata creation processing module 33 performs charging processing of the AV contents and records the charging information of the information provider in the integrated charging information region 71 and the charging detail region 72 (see FIG. 13) of the provider charging information DB22.

In step S48, according to the charging information recorded in the provider charging information DB22 in the processing of step S47, the individual metadata creation processing module 33 updates the user information (such as user frequency) in the integrated information region 51 of the user information DB4 and updates the charging information in terms of usage in the charging detail region 52, thus completing the processing.

Figure 18:
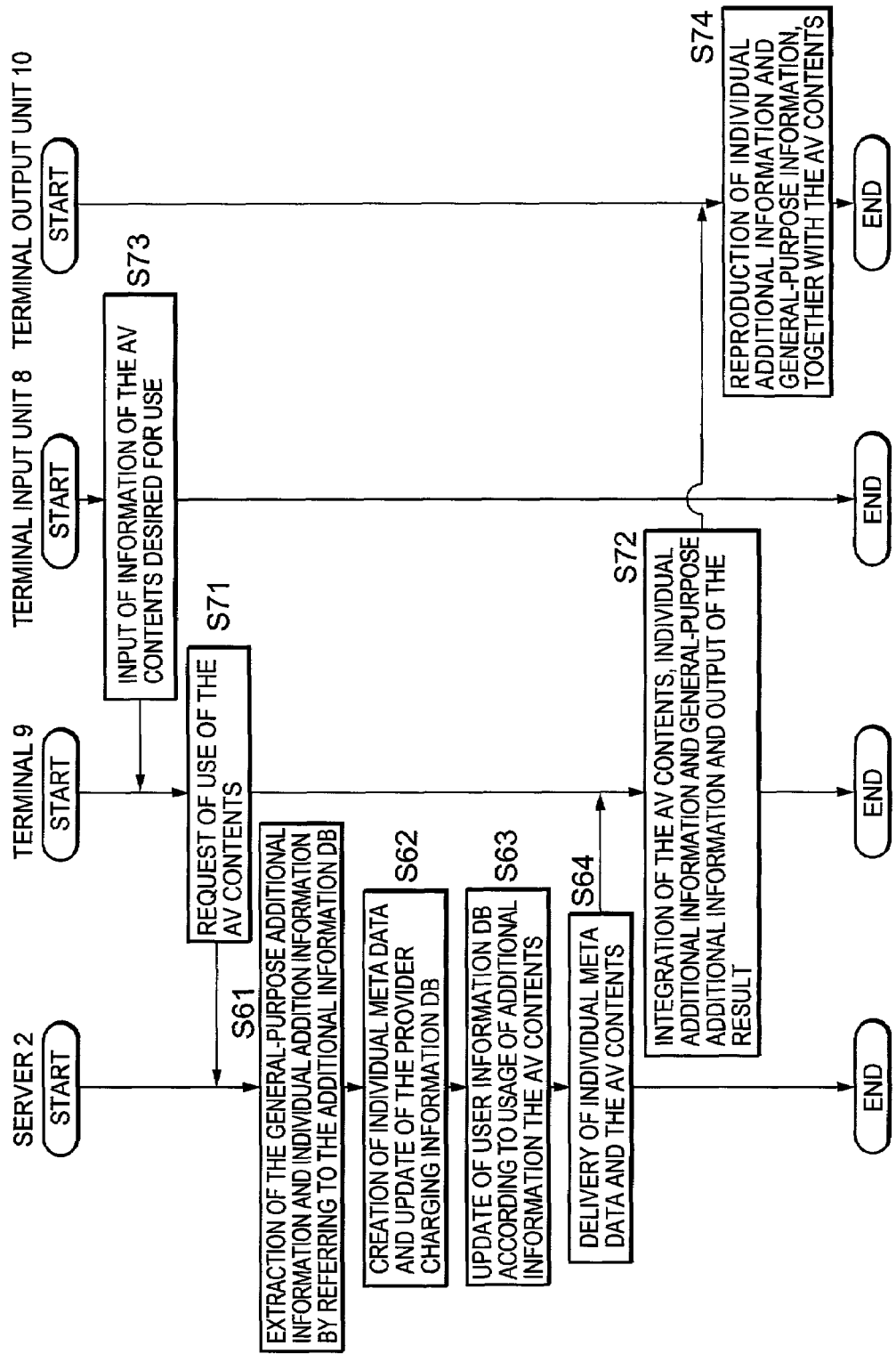
FIG. 18 is a flowchart explaining individual data delivery processing executed by the server 2 of FIG. 3.

Next, referring to a flowchart in FIG. 18, description of data delivery processing executed by the server 2 will be provided.

In step S73, the terminal input unit 8, operated by the user of the terminal apparatus 9, inputs the information of the AV contents to be desired. Thereby, for instance, the kind of information that can be specified as to the AV contents such as title and ID No. and the degree of detail and genre of the individual additional information which the user desires to use concurrently can be inputted. In step S71, based on the information of the AV contents inputted by the terminal input unit 8, the terminal apparatus 9 issues a request via the Internet 7 to the server 2 for using the specified AV contents.

In step S61, the server 2 (including the individual metadata creation processing module 33) receives a request for usage of the specified AV contents from the terminal apparatus 9 and analyzes the usage request. Based on the result of analysis, the server 2 extracts the general purpose additional information from the additional information master DB21, while, at the same time, referring to the usage status of the user which is stored in the user information DB4, and extracts the individual additional information needed by the user from the additional information master DB 21.

In step S62, the server 2 (including the individual metadata creation processing module 33) edits the general purpose additional information and the individual additional information extracted in the processing of step S61 and creates the individual metadata for delivery. Then, the server 2 (including the individual metadata creation processing module 33), according to the created individual metadata, performs charging processing of the AV contents and records or updates the payment information (such as reverse charging information) or charging information in the provider charging information DB22.

In step S63, the server 2 (including the individual metadata creation processing module 33) updates the user information and the charging information on the user information DB4 according to the usage of the additional information of the AV contents.

In step S64, the server 2 (including the individual metadata creation processing module 33) reads out the individual metadata created in the processing of step S63, and the AV contents, delivery of which is requested and which are stored in the AV contents DB5, and delivers via the Internet 7 to the terminal apparatus 9.

In step S72, the terminal apparatus 9 receives the AV contents and the individual metadata (including the general purpose additional information and the individual additional information) which are delivered, integrates and synchronizes these pieces of information, and outputs them to the terminal output unit 10. In step S74, the terminal output unit 10 reproduces or displays the video data and audio data corresponding to the AV contents supplied from the terminal apparatus 9 together with the general purpose additional information and the individual additional information Accordingly, as shown in FIG. 19, the video of the AV contents are displayed on a display 81 of the terminal output unit 10 with the audio (music) of the AV contents being reproduced in speakers 82-L and 82-R, and synchronously with the AV contents reproduction, the individual additional information display region 83 displays, e.g., the individual additional information such as the advertisement regarding an object (product) that appears in a scene, while the general purpose additional information display region 84 displays, e.g., the general purpose additional information such as the location of a video scene, the time and date of filming, an explanation of a scene or title to the background music.

By the way, the individual additional information and the general purpose additional information are not limited to textual information. For instance, depending on the data format of information, those may be superposed on the video of the AV contents on the display 81, and may be superposed on the audio of the AV contents to output to the speakers 82-L and 82-R in a multiplex form. This processing enables the terminal output unit 10 to dispense with the individual additional information display region 83 and the general purpose additional information display region 84.

Description of the user information update processing executed by the server 2 will follow with reference to a flowchart in FIG. 20.

In step S93, the terminal input unit 8 is operated by the user of the terminal apparatus 9 to input the information which is desired to be updated, for example, such information includes usage classification, degree of detail of the additional information to be provided, the genre or the like. In step S91, the terminal apparatus 9, based on the update information from the terminal input unit 8, issues a request for a data update via the Internet to the server 2.

In step S81, the server 2 (including the user information update processing module 34) receives a data update request from the terminal apparatus 9, and, based thereon, updates the user information DB4. In step S82, the server 2 transmits the update result of the user information via the Internet 7 to the terminal apparatus 9.

In step S92, the terminal apparatus 9 receives the transmitted update result of the user information and outputs the result to the terminal output unit 10. In step S94, the terminal output unit 10 causes the display 81 to display the update result of the user information supplied from the terminal apparatus 9.

As is clear from the foregoing description, the processing according to an embodiment of this invention is arranged to enable the individual metadata to be created from the general purpose additional information of the AV contents and the individual additional information needed by the user. Consequently, a major advantage of an embodiment of this invention is that individual information per user can be delivered.

All or part of the server 2 and the terminal apparatus 9 as well as the general purpose additional information registration processing module 31, the individual additional information registration processing module 32, the individual metadata creation processing module 33, the information delivery processing module 34, the user information update processing module 35 or the like mentioned above are made up of computers. For example, in the case of constituting the server 2 with a computer, its construction is in the manner shown in FIG. 21.

Various types of processing are executed by the CPU (Central Processing Unit) 101 according to the programs stored in a ROM (Read Only Memory) 102 and a storage unit 108. Programs and data necessary for the CPU 101 to carry out various types of processing are stored in a RAM (Random Access Memory) 103 as the occasion may demand. The CPU 101, the ROM 102, and the RAM 103 are mutually connected with one another via bus 104, while, at the same time, being connected with an input/output interface 105. The server input unit 1 comprising a keyboard and a mouse, an output module 107 comprising a LCD (Liquid Crystal Display), a CRT (Cathode Ray Tube), speakers or the like, a storage module 108 composed of a hard disk or the like, and a communication module 109 communicating with the Internet 7 are all connected with the input/output interface 105.

In addition, a drive 110 for installing programs is connected with the input/output interface 105 which is designed so that a magnetic disc 121, an optical disc 122, a magneto-optical disc 123, a semiconductor memory 124 or the like can be fitted therewith. Various types of processing described above are executed by the CPU 101 according the programs or software.

Execution of a preceding series of processing which may be rendered by the hardware may be rendered by the software as well. When a series of processing is to be executed by the software, it is possible either by way of using a computer, its own hardware containing a built-in program which makes up that software or installing various programs in recording media which can execute various functions, e.g., a general purpose personal computer.

As shown in FIG. 21, separately from the computer, the recording medium according to the present invention comprises not only packaged media composed of the magnetic disc 121 (including a floppy disc), the optical disc 122 [including a CD-ROM (Compact Disc-Read Only Memory) and a DVD (Digital Versatile Disc)], the magneto-optical disc 123

[including a MD (Mini-Disc)], a semiconductor memory 124 or the like which are made available to provide programs to the user and in which programs are recorded, but also the ROM 102, which is provided to the user in the condition of already being built in the computer and in which programs are recorded, a hard disc included in a storage module 108 or the like.

It should be mentioned that the steps of describing programs to be recorded in the recording medium naturally include processing in time series according to the described order, but also include processing which is not necessarily processed in the time series manner but executed in parallel or individually.

It should also be mentioned that the system according to an embodiment of the present invention represents equipment comprising a plurality of apparatus and devices.

As the foregoing explanation shows, according to the programs recorded in the information processing apparatus, the information processing method, and the recording medium of the present invention, when the additional information and the individual additional information regarding the contents data are stored while receiving a delivery request from other apparatus, based thereon, the additional information and the individual additional information in storage are extracted, the extracted additional information and individual additional information generating the individual data, the individual data being arranged to be transmitted, together with the contents data, via network to other apparatus. In this way, the present invention contributes to enabling the individual information to be conveyed to each user together with music data and video data.

Further, according to the information processing system of the present invention, the first information processing apparatus stores the additional information and the individual information regarding the contents data, and when the delivery request is received from other apparatus, based thereon, the additional information and the individual additional information are extracted, the individual data being generated from the extracted additional information and individual additional information, the individual data being transmitted via network to the second information processing apparatus, together with the contents data, whereas the second information apparatus requests a delivery of the specified contents data to the first information processing apparatus, receiving the contents data and the individual data supplied from the first information processing apparatus and integrating these data so as to output them, thereby enabling the user to use the individual information concurrently with music data and video data.

What is claimed is:

1. An information processing apparatus for delivering contents data via a network to another apparatus, wherein the contents data includes video contents data, the information processing apparatus comprising:
 first registration means for registering general additional information regarding said contents data for each of two or more segments, scenes, or objects included in said contents data,
 said general additional information comprising at least one of time or date of filming a video scene of said contents data, an explanation of a scene, title to background music, contents ID, general purpose additional information ID, part covered by additional information, name covered by additional information, segment identifier, scene identifier, object identifier, and additional information classification;
 second registration means for registering individual additional information of said contents data on the basis of at least said contents data for each of the two or more segments, scenes, or objects included in said contents data,
 wherein said individual additional information for each segment, scene, or object, is associated with the segment, scene, or object, based on an associated segment identifier, scene identifier, or object identifier;
 storage means for storing said general additional information registered by said first registration means and said individual additional information registered by said second registration means;
 extraction means for extracting said general additional information and said individual additional information stored in said storage means if a delivery request for said contents data is received from the other apparatus,
 wherein said extraction means is configured to extract said individual additional information on the basis of user information comprising at least one of user usage status, information genre desired by a user, degree of details of information desired by a user, and user usage classification;
 generation means for generating individual data to be transmitted to said other apparatus from said general additional information and said individual additional information extracted by said extraction means as a data file including metadata; and
 transmission means for transmitting said contents data and said data file via said network to said other apparatus, to enable, for said video contents data, each segment, scene, or object of the two or more segments, scenes, or objects of said video contents data to be simultaneously displayed with said general additional information and said individual additional information for that segment, scene, or object, on a display screen at said other apparatus;
 wherein said transmission means is configured to deliver said contents data together with said data file in response to a request generated by said other apparatus.

2. The information processing apparatus of claim 1, further comprising:
 recording means for recording charging information on the basis of said individual data generated by said generation means.

3. An information processing method for delivering contents data via a network to another apparatus, the contents data including video data, the method comprising the steps of:
 analyzing a delivery request for contents data received from said other apparatus;
 extracting general purpose additional information of said contents data and individual additional information in accordance with said analysis of said analyzing step,
 wherein said individual additional information comprises, for each of two or more segments, scenes, or objects of said video contents data, information specifically associated with that segment, scene, or object, and
 wherein the individual additional information is extracted on the basis of user information comprising at least one of user usage status, information genre desired by a user, degree of details of information desired by a user, and user usage classification;
 generating a data file of individual metadata from said extracted general purpose additional information and said extracted individual additional information;
 updating charging information on the basis of said generated individual metadata; and
 transmitting said contents data together with said individual metadata via said network to said other apparatus;
 wherein said general purpose additional information comprises at least one of time or date of filming a video scene of said contents data, an explanation of a scene, title to background music, contents ID, general purpose additional information ID, part covered by additional information, name covered by additional information, segment identifier, scene identifier, object identifier, and additional information classification.

4. An information processing method for an information processing apparatus for delivering contents data via a network to another apparatus, wherein the contents data includes video contents data, said method comprising the steps of:

registering general additional information regarding said contents data for each of two or more segments, scenes, or objects included in said contents data, said general additional information comprising at least one of time or date of filming a video scene of said contents data, an explanation of a scene, title to background music, contents ID, general purpose additional information ID, part covered by additional information, name covered by additional information, segment identifier, scene identifier, object identifier, and additional information classification;

registering individual additional information of said contents data on the basis of at least said contents data, for each of the two or more segments, scenes, or objects included in said contents data, wherein said individual additional information for each segment, scene, or object, is associated with the segment, scene, or object, based on an associated segment identifier, scene identifier, or object identifier;

extracting said general additional information and said individual additional information if a delivery request for contents data is received from said other apparatus, wherein said individual additional information is extracted on the basis of user information comprising at least one of user usage status, information genre desired by a user, degree of details of information desired by a user, and user usage classification;

generating, as a data file including metadata, individual data for transmission to said other apparatus from said extracted general additional information and said individual additional information; and transmitting said data file together with said contents data via said network to said other apparatus, to enable, for said video contents data, each segment, scene, or object of the two or more segments, scenes, or objects of said video contents data to be simultaneously displayed with said general additional information and said individual additional information for that segment, scene, or object, on a display screen at said other apparatus;

wherein said contents data is delivered together with said data file in response to a request generated by said other apparatus.

5. A recording medium comprising a computer program for causing an information processing apparatus to perform a method to deliver contents data via a network to another apparatus, the contents data including video contents data, said method comprising the steps of:

registering general additional information regarding said contents data for each of two or more segments, scenes, or objects included in said contents data, said general additional information comprising at least one of time or date of filming a video scene of said contents data, an explanation of a scene, title to background music, contents ID, general purpose additional information ID, part covered by additional information, name covered by additional information, segment identifier, scene identifier, object identifier, and additional information classification;

registering individual additional information of said contents data on the basis of at least said contents data for each of the two or more segments, scenes, or objects included in said contents data, wherein said individual additional information for each segment, scene, or object, is associated with the segment, scene, or object based on an associated segment identifier, scene identifier, or object identifier;

extracting said general additional information and said individual additional information if a delivery request for contents data is received from said other apparatus, wherein said individual additional information is extracted on the basis of user information comprising at least one of user usage status, information genre desired by a user, degree of details of information desired by a user, and user usage classification;

generating, as a data file including metadata, individual data for transmission to said other apparatus from said extracted general additional information and said individual additional information; and transmitting said data file, together with said contents data, via said network to said other apparatus, to enable for said video contents data, each segment, scene, or object of the two or more segments, scenes, or objects of said video contents data to be simultaneously displayed with said general additional information and said individual additional information for that segment, scene, or object to be simultaneously displayed on a display screen at said other apparatus;

wherein said contents data is delivered together with said data file in response to a request generated by said other apparatus.

6. An information processing system having a first information processing apparatus and a second information processing apparatus, wherein:

said first information processing apparatus comprises:

first registration means for registering general additional information regarding contents data, the contents data including video contents data for each of two or more segments, scenes, or objects included in said contents data, said general additional information comprising at least one of time or date of filming a video scene of said contents data, an explanation of a scene, title to background music, contents ID, general purpose additional information ID, part covered by additional information, name covered by additional information, segment identifier scene identifier, object identifier, and additional information classification;

second registration means for registering individual additional information of said contents data on the basis of at least said contents data for each of the two or more segments, scenes, or objects included in said contents data;

wherein said individual additional information for each segment, scene, or object, is associated the segment, scene, or object, based on an associated segment identifier, scene identifier, or object identifier;

storage means for storing said general additional information registered by said first registration means and said individual additional information registered by said second registration means;

extraction means for extracting said general additional information and said individual additional information stored in said storage means if a delivery request for contents data is received from other apparatus, wherein said individual additional information is extracted on the basis of user information comprising at least one of user usage status and user usage classification;

generation means for generating individual data to be transmitted to said other apparatus from said general additional information and said individual additional information extracted by said extraction means as a data file including metadata; and transmission means for transmitting said contents data and said data The generated by said generation means via said network to said other apparatus, to enable, for said video contents data, each segment, scene, or object of the two or more segments, scenes, or objects of said video contents data to be simultaneously displayed with said general additional information and said individual additional information for that segment, scene, or object, on a display screen at said other apparatus, and said second information processing apparatus comprises:

a delivery request means for transmitting information specifying said contents data so as to receive desired said contents data and requesting a delivery of specified contents data to said first information processing apparatus; and an output means for receiving and integrating said contents data and said individual data supplied from said first information processing apparatus, and outputting integrated data;

wherein said transmission means is configured to deliver said contents data together with said individual data in response to a request generated by said second apparatus.

7. The information processing apparatus of claim 1, wherein said general additional information includes at least an object number representing an object appearing within said contents data.

8. The information processing method of claim 4 wherein said additional information and said individual additional information are each registered for each segment, scene or object appearing within said contents data.

9. The information processing method of claim 8 wherein said individual additional information is registered for each object within said contents data.

10. The recording medium of claim 5 wherein said additional information and said individual additional information are each registered for each segment, scene or object appearing within said contents data.

11. The recording medium of claim 10 wherein said individual additional information is registered for each object appearing within said contents data.

12. The information processing system of claim 6 wherein said additional information and said individual additional information are each registered for each segment, scene or object appearing within said contents data.

13. The information processing system of claim 12 wherein said individual additional information is registered for each object appearing within said contents data.

14. An information processing method for an information processing apparatus for delivering contents data via a network to another apparatus, the contents data including video contents data, said method comprising the steps of:

registering general additional information regarding said contents data for each of two or more segments, scenes, or objects included in said contents data, said general additional information comprising at least one of time or date of filming a video scene of said contents data, an explanation of a scene, title to background music, contents ID, general purpose additional information ID, part covered by additional information, name covered by additional information, segment identifier, scene identifier, object identifier, and additional information classification;

registering individual additional information of said contents data on the basis of at least said contents data for each of the two or more segments, scenes, or objects included in said contents data, wherein said individual additional information for each segment, scene, or object, is associated with the segment, scene, or object, based on an associated segment identifier, scene identifier, or object identifier;

controlling storage of said additional information registered and said registered individual additional information;

extracting said general additional information and said individual additional information in response to a delivery request for contents data received from said other apparatus, wherein said individual additional information is extracted on the basis of user information comprising at least one of user usage status, information genre desired by a user, degree of details of information desired by a user, and user usage classification;

generating individual data for transmission to said other apparatus from said general additional information and said individual additional information which were extracted by the processing of said extraction step as a data file including metadata; and transmitting said data file generated in said generation step, together with said contents data, via said network to said other apparatus, to enable, for said video contents data, each segment, scene, or object of the two or more segments, scenes, or objects of said video contents data to be simultaneously displayed with said general additional information and said individual additional information for that segment, scene, or object, on a display screen at said other apparatus.

15. The information processing method of claim 3, wherein said updating charging information updates charges to at least an end user for use of said contents data and/or individual metadata on the basis of said generated individual metadata.

16. The information processing apparatus of claim 1, wherein said general additional information comprises the time or date of filming a video scene of said contents data.

17. The information processing apparatus of claim 1, wherein said general additional information comprises said explanation of a scene.

18. The information processing apparatus of claim 1, wherein said general additional information comprises said general purpose additional information ID.

19. The information processing apparatus of claim 1, wherein said general additional information comprises said part covered by additional information.

20. The information processing apparatus of claim 1, wherein said general additional information comprises said name covered by additional information.

21. The information processing apparatus of claim 1, wherein said general additional information comprises said segment identifier.

22. The information processing apparatus of claim 1, wherein said general additional information comprises said object identifier.

23. The information processing apparatus of claim 1, wherein said general additional information comprises said additional information classification.

* * * * *